United States Patent
Hayashi et al.

(10) Patent No.: US 11,411,427 B2
(45) Date of Patent: Aug. 9, 2022

(54) UNINTERRUPTIBLE POWER SUPPLY APPARATUS

(71) Applicant: TOSHIBA MITSUBISHI-ELECTRIC INDUSTRIAL SYSTEMS CORPORATION, Chuo-ku (JP)

(72) Inventors: Yousuke Hayashi, Chuo-ku (JP); Toshihide Nakano, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 68 days.

(21) Appl. No.: 17/258,318

(22) PCT Filed: Aug. 3, 2018

(86) PCT No.: PCT/JP2018/029200
§ 371 (c)(1),
(2) Date: Jan. 6, 2021

(87) PCT Pub. No.: WO2020/026430
PCT Pub. Date: Feb. 6, 2020

(65) Prior Publication Data
US 2021/0175742 A1 Jun. 10, 2021

(51) Int. Cl.
*H02J 9/06* (2006.01)
*H02M 5/458* (2006.01)

(52) U.S. Cl.
CPC ............. *H02J 9/063* (2020.01); *H02J 9/068* (2020.01); *H02M 5/458* (2013.01)

(58) Field of Classification Search
CPC ........... H02J 9/063; H02J 9/068; H02M 5/458
USPC ........................................................ 363/37
See application file for complete search history.

(56) References Cited

U.S. PATENT DOCUMENTS

| | | | |
|---|---|---|---|
| 2011/0134672 A1* | 6/2011 | Sato | H02M 7/487 |
| | | | 363/126 |
| 2021/0036632 A1* | 2/2021 | Hayashi | H02M 3/158 |

FOREIGN PATENT DOCUMENTS

| | | |
|---|---|---|
| JP | 2013-176296 A | 9/2013 |
| JP | 5986005 B2 | 9/2016 |
| WO | WO 2015/185630 A1 | 12/2015 |
| WO | WO-2015185630 A1 * | 12/2015 ............ H02J 7/0068 |

OTHER PUBLICATIONS

Office Action dated Mar. 16, 2021 in corresponding Indian Patent Application No. 202017056428 (with English Translation), 5 page.
International Search Report dated Aug. 28, 2018 in PCT/JP2018/029200 filed on Aug. 3, 2018, 2 pages.

* cited by examiner

*Primary Examiner* — Yemane Mehari
(74) *Attorney, Agent, or Firm* — Oblon, McClelland, Maier & Neustadt, L.L.P.

(57) ABSTRACT

In an uninterruptible power supply apparatus, in a power failure of a commercial AC power supply, a switch is turned off to electrically cut off the commercial AC power supply from an AC input filter, and a DC voltage converter is controlled such that a DC voltage that is the difference between terminal-to-terminal voltages of first and second capacitors is eliminated, and when the DC voltage exceeds a threshold voltage, a converter is controlled to reduce the DC voltage.

9 Claims, 20 Drawing Sheets

FIG.3
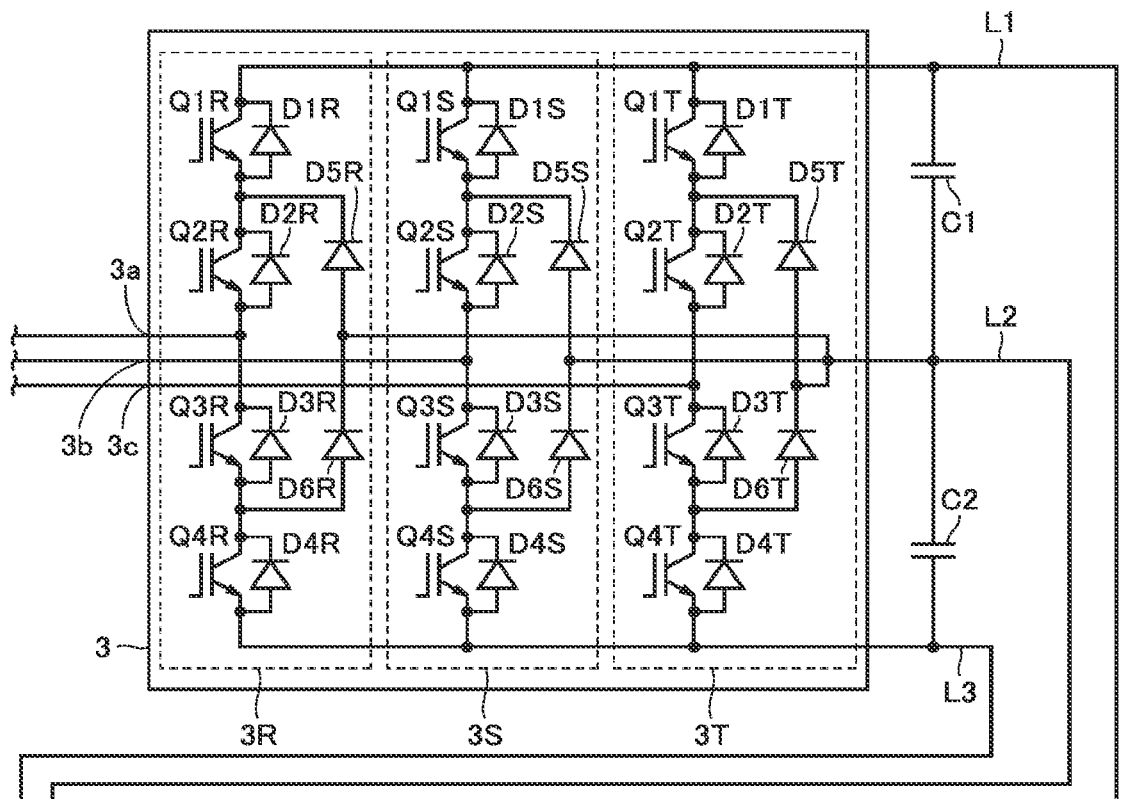
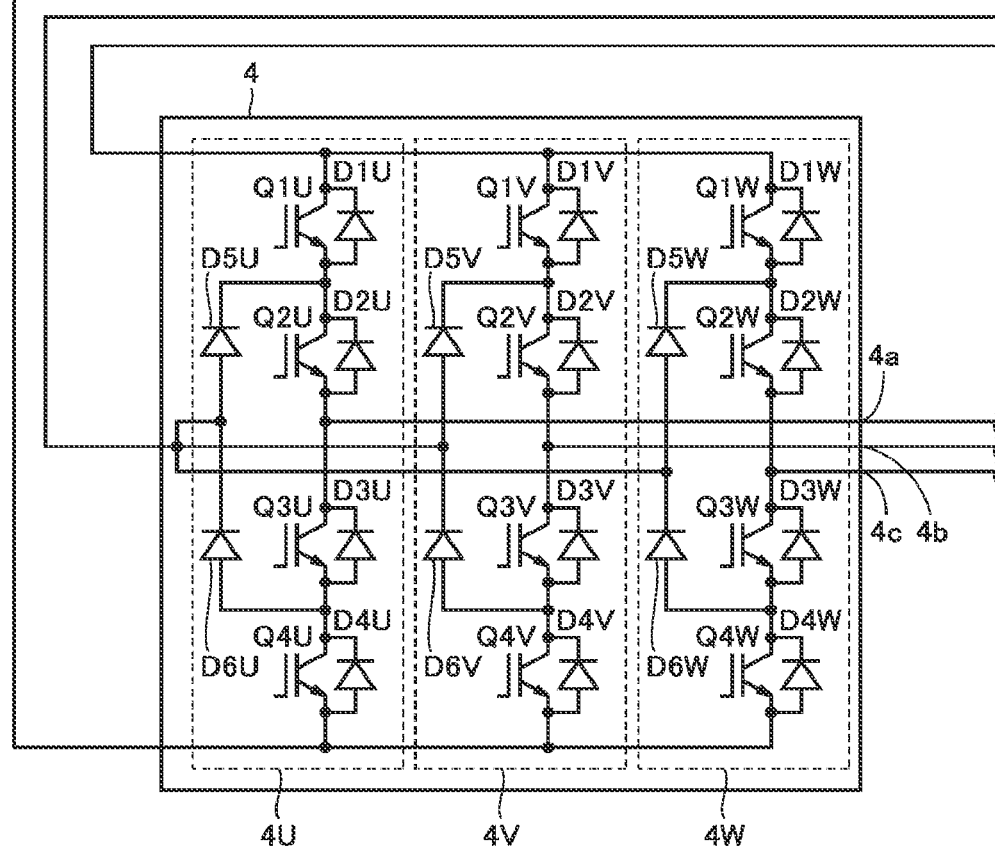

FIG.11

|        | Q1  | Q2  | Q3  | Q4  |
|--------|-----|-----|-----|-----|
| MODE 1 | ON  | ON  | OFF | OFF |
| MODE 2 | OFF | ON  | ON  | OFF |
| MODE 3 | OFF | OFF | ON  | ON  |

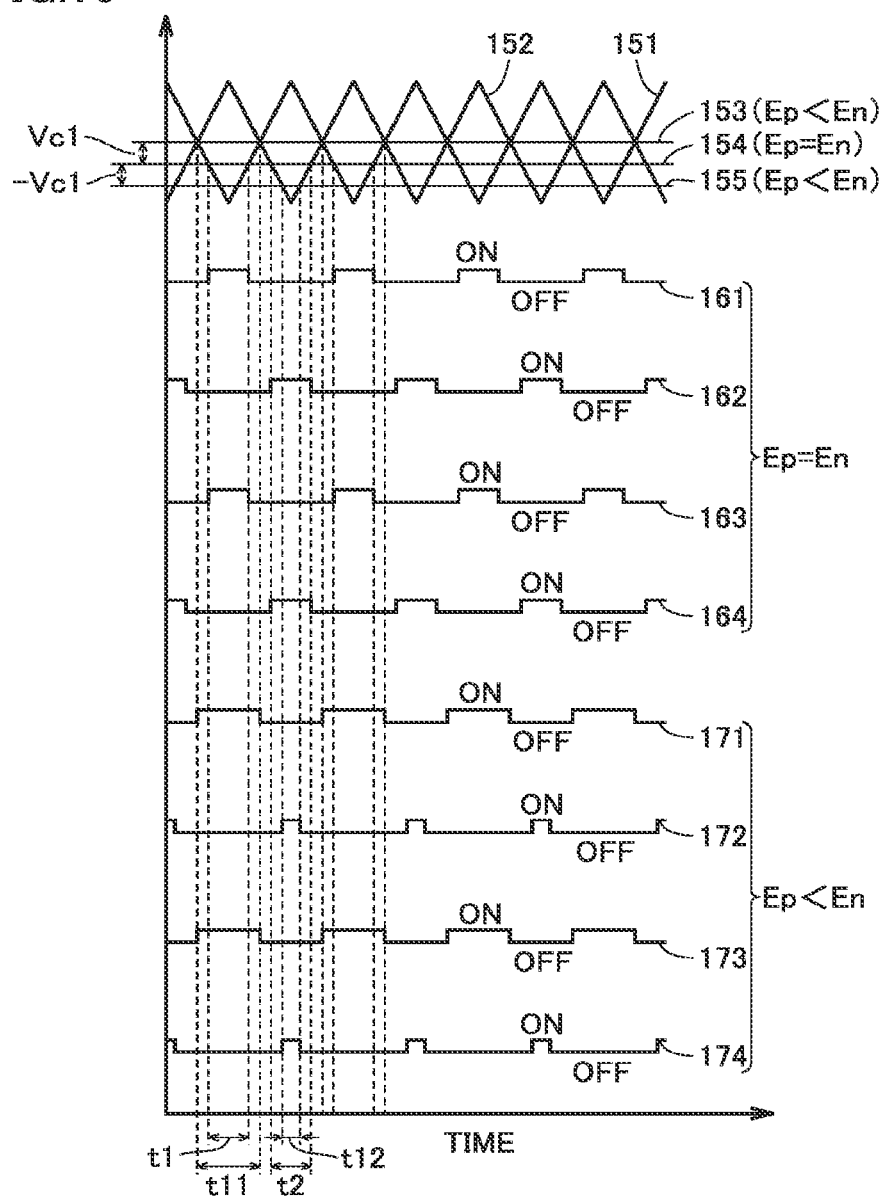

|  | Q11 | Q12 | Q13 | Q14 |
|---|---|---|---|---|
| MODE 1 | ON | ON | OFF | OFF |
| MODE 2 | OFF | ON | ON | OFF |
| MODE 3 | OFF | OFF | ON | ON |

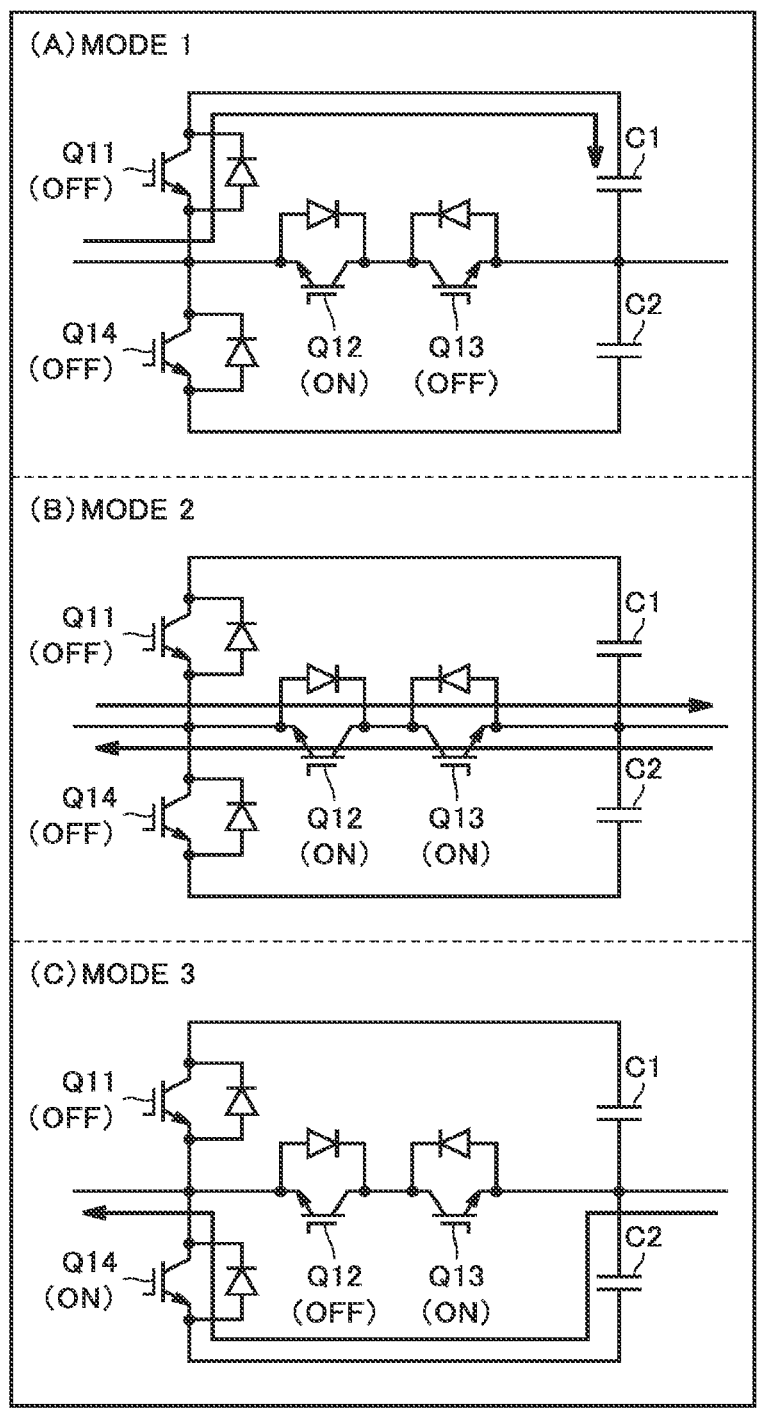

UNINTERRUPTIBLE POWER SUPPLY APPARATUS

TECHNICAL FIELD

The present invention relates to an uninterruptible power supply apparatus and more particularly to a three-phase four-wire uninterruptible power supply apparatus.

BACKGROUND ART

For example, Japanese Patent Laying-Open No. 2013-176296 (PTL 1) discloses a three-phase three-wire uninterruptible power supply apparatus. This uninterruptible power supply apparatus includes a converter that converts AC voltage supplied from an AC power supply to first to third DC voltages and outputs the first to third DC voltages to first to third DC lines in a sound state of the AC power supply and stops operation in a power failure of the AC power supply, a DC voltage converter that converts a fourth DC voltage from a DC power supply source to first to third DC voltages and supplies the first to third DC voltages to the first to third DC lines in a power failure of the AC power supply, and an inverter that converts the first to third DC voltages from the converter and the DC voltage converter to AC voltage and supplies the AC voltage to a load.

This uninterruptible power supply apparatus further includes a first capacitor connected between the first and second DC lines, a second capacitor connected between the second and third DC lines, first and second voltage detectors that detect terminal-to-terminal voltages of the first and second capacitors, respectively, a computing unit that obtains a first voltage that is the sum of the detected values of the first and second voltage detectors and a second voltage that is the difference between the detected values of the first and second voltage detectors, a first control unit that controls the converter such that the first voltage becomes a reference voltage and the second voltage is eliminated in a sound state of the AC power supply, and a second control unit that controls the DC voltage converter such that the first voltage becomes a reference voltage and the second voltage is eliminated in a power failure of the AC power supply.

In this uninterruptible power supply apparatus, therefore, the sum of terminal-to-terminal voltages of the first and second capacitors can be kept to a reference voltage, and the difference between terminal-to-terminal voltages of the first and second capacitors can be kept to 0 V.

CITATION LIST

Patent Literature

PTL 1: Japanese Patent Laying-Open No. 2013-176296

SUMMARY OF INVENTION

Technical Problem

When the load includes a three-phase transformer and a load body, three-phase excitation current flows through the three-phase transformer, and each of three-phase output currents of the uninterruptible power supply apparatus has a positive-negative asymmetric waveform. When all of the AC power supply, the uninterruptible power supply apparatus, the three-phase transformer, and the load body are three-phase three-wire systems, the sum of three-phase AC currents flowing through the three-phase transformer is zero and therefore it is less likely that the terminal-to-terminal voltages of the first and second converters are imbalanced.

When the AC power supply, the uninterruptible power supply apparatus, the three-phase transformer, and the load body are three-phase four-wire systems, however, current flows through a neutral point line. Therefore, the sum of three-phase AC currents flowing through the three-phase transformer is not zero and has a positive-negative asymmetric waveform, and the terminal-to-terminal voltages of the first and second capacitors may be imbalanced. In particular, when load current is small, output current of the DC voltage converter is small in a power failure of the AC power supply, so that the terminal-to-terminal voltages of the first and second capacitors may be imbalanced.

A main object of the present invention is therefore to provide a three-phase four-wire uninterruptible power supply apparatus that can eliminate the imbalance between the terminal-to-terminal voltages of the first and second capacitors in a power failure even when a load includes a three-phase transformer and a load body, and load current is small.

Solution to Problem

An uninterruptible power supply apparatus according to the present invention includes: first to third DC lines; a first capacitor connected between the first and second DC lines; a second capacitor connected between the second and third DC lines; a neutral point line connected to a neutral point terminal of a three-phase four-wire AC power supply, the second DC line, and a neutral point terminal of a three-phase four-wire load; a switch provided corresponding to each phase of the AC power supply, having one terminal receiving AC voltage of a corresponding phase supplied from the AC power supply, turned on in a sound state of the AC power supply, and turned off in a power failure of the AC power supply; an AC input filter including a third capacitor connected between the other terminal of the switch and the neutral point line, and a reactor having one terminal connected to the other terminal of the switch; a converter connected between the other terminal of the reactor and the first to third DC lines and including a first multi-level circuit that converts AC voltage and first to third DC voltages to each other, the converter converting AC power from the AC power supply to DC power and supplying the DC power to the first to third DC lines in a sound state of the AC power supply; a DC voltage converter connected between a DC power supply source and the first to third DC lines and including a second multi-level circuit that converts a fourth DC voltage supplied from the DC power supply source and the first to third DC voltages to each other, the DC voltage converter supplying DC power from the DC power supply source to the first to third DC lines in a power failure of the AC power supply; an inverter provided between the first to third DC lines and the load and including a third multi-level circuit that converts the first to third DC voltages and AC voltage to each other, the inverter converting DC power supplied from the converter and the DC voltage converter to AC power and supplying the AC power to the load; first and second voltage detectors that detect terminal-to-terminal voltages of the first and second capacitors, respectively; a computing unit that obtains a first voltage that is a sum of terminal-to-terminal voltages of the first and second capacitors and a second voltage that is a difference between terminal-to-terminal voltages of the first and second capacitors, based on detection results of the first and second voltage detectors; a first control unit, wherein in a sound state of the AC power supply, the first control unit controls the converter such that the first voltage becomes a first reference voltage and the second voltage is eliminated, and in a power failure of the AC power supply, the first control unit stops the converter when an absolute value of the second voltage is smaller than a predetermined threshold voltage, and controls the converter to reduce the second voltage when an absolute value of the second voltage is larger than the predetermined threshold voltage; and a second control unit that controls the DC voltage converter such that the first voltage becomes the first reference voltage and the second voltage is eliminated, in a power failure of the AC power supply.

Advantageous Effects of Invention

In this uninterruptible power supply apparatus, in a power failure of the AC power supply, the switch is turned off to electrically cut off the AC power supply from the AC input filter, and the DC voltage converter is controlled such that the second voltage that is the difference between the terminal-to-terminal voltages of the first and second capacitors is eliminated, and when the absolute value of the second voltage exceeds a predetermined threshold voltage, the converter is controlled so that the second voltage is reduced. Therefore, the imbalance between the terminal-to-terminal voltages of the first and second capacitors in a power failure can be eliminated even when a load includes a three-phase four-wire transformer and a load body, and load current is small.

BRIEF DESCRIPTION OF DRAWINGS

FIG. 3 is a circuit block diagram showing a configuration of a converter and an inverter shown in FIG. 1.

FIG. 11 is a diagram showing the switching patterns of four IGBT devices included in each phase arm of the converter shown in FIG. 3.

FIG. 16 is a time chart showing the operation of control unit 54 shown in FIG. 7.

FIG. 17 is a diagram showing the switching patterns of IGBT devices Q1D to Q4D shown in FIG. 4.

FIG. 25 is a circuit diagram showing the operation of each phase arm in the modes shown in FIG. 24.

DESCRIPTION OF EMBODIMENTS

First Embodiment

Figure 1:
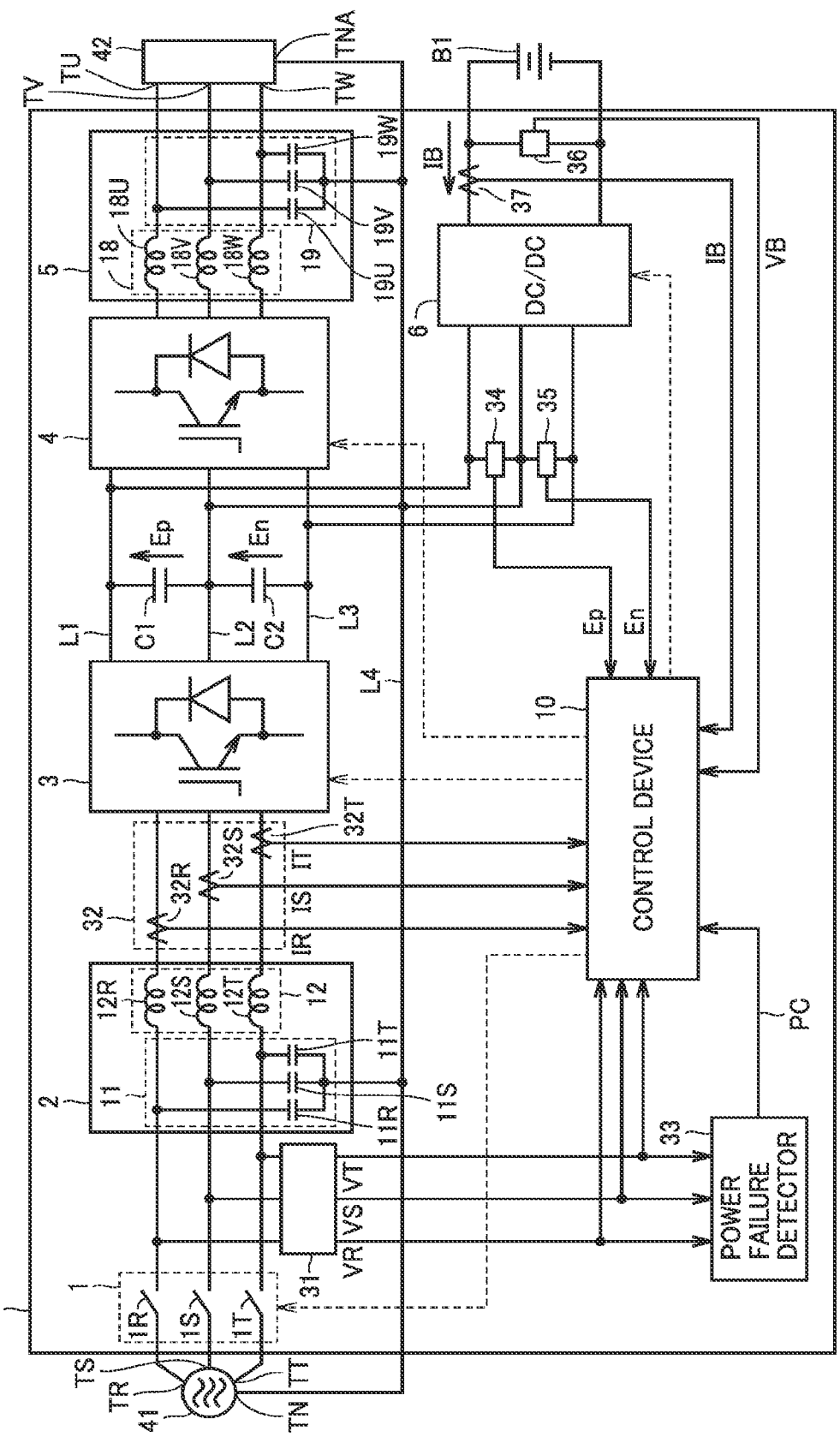
FIG. 1 is a circuit block diagram showing an overall configuration of an uninterruptible power supply apparatus according to a first embodiment of the present invention.

FIG. 1 is a block diagram showing an overall configuration of an uninterruptible power supply apparatus U1 according to a first embodiment of the present invention. In FIG. 1, uninterruptible power supply apparatus U1 is a three-phase four-wire system and includes a switch 1, an AC input filter 2, a converter 3, an inverter 4, an AC output filter 5, a DC voltage converter (denoted by "DC/DC" in the FIG. 6, a control device 10, DC lines L1 to L3, a neutral point line L4, capacitors C1 and C2, voltage detectors 31, 34, 35, and 36, current detectors 32 and 37, and a power failure detector 33.

Switch 1 includes switches 1R, 1S, and 1T. One terminal of each of switches 1R, 1S, and 1T is connected to the corresponding one of R-phase terminal TR, S-phase terminal TS, and T-phase terminal TT of three-phase four-wire commercial AC power supply 41 to receive the corresponding one of R-phase voltage VR, S-phase voltage VS, and T-phase voltage VT supplied from commercial AC power supply 41. A neutral point terminal TN of commercial AC power supply 41 is connected to one end of neutral point line L4.

Switches 1R, 1S, and 1T are controlled by control device 10, turned on when three-phase AC power is supplied normally from commercial AC power supply 41 (in a sound state of commercial AC power supply 41), and turned off when supply of three-phase AC power from commercial AC power supply 41 is stopped (in a power failure of commercial AC power supply 41). Switches 1R, 1S, and 1T are turned off in a power failure of commercial AC power supply 41 to electrically cut off commercial AC power supply 41 from AC input filter 2.

AC input filter 2 is a three-phase LC filter circuit configured with a capacitor 11 (capacitors 11R, 11S, and 11T) and a reactor 12 (reactors 12R, 12S, and 12T). One electrode of each of capacitors 11R, 11S, and 11T is connected to the other terminal of the corresponding one of switches 1R, 1S, and 1T, and the other electrodes thereof are connected together to neutral point line L4. One terminal of each of reactors 12R, 12S, and 12T is connected to the other terminal of the corresponding one of switches 1R, 1S, and 1T, and the other terminals of reactors 12R, 12S, and 12T are connected to three input nodes of converter 3.

AC input filter 2 is a low-pass filter, allows AC power having a commercial frequency supplied from commercial AC power supply 41 to pass through converter 3, and prevents a signal with a switching frequency produced in converter 3 from passing toward commercial AC power supply 41.

One end of each of DC lines L1 to L3 is connected to the corresponding one of three output nodes of converter 3, and the other ends thereof are connected to three input nodes of inverter 4. DC line L2 is connected to neutral point line L4. DC lines L1 to L3 are connected to three high voltage-side nodes of DC voltage converter 6. DC lines L1 to L3 are brought to a positive voltage, a neutral point voltage, and a negative voltage, respectively, by converter 3 and DC voltage converter 6.

Capacitor C1 is connected between DC lines L1 and L2 to smooth and stabilize DC voltage Ep between DC lines L1 and L2. Capacitor C2 is connected between DC lines L2 and L3 to smooth and stabilize DC voltage En between DC lines L2 and L3.

Converter 3 is controlled by control device 10 and converts three-phase AC power supplied from commercial AC power supply 41 through AC input filter 2 to DC power and supplies the DC power to inverter 4 and DC voltage converter 6 through DC lines L1 to L3, in a sound state of commercial AC power supply 41.

In doing so, control device 10 controls converter 3 such that voltage VDC=Ep+En that is the sum of DC voltages Ep and En becomes reference DC voltage VDCr (first reference voltage) and voltage ΔE=Ep−En that is the difference between DC voltages Ep and En becomes zero.

In a power failure of commercial AC power supply 41, control device 10 stops the operation of converter 3 when DC voltage ΔE is smaller than threshold voltage ETH, and controls converter 3 to reduce DC voltage ΔE when DC voltage ΔE is larger than threshold voltage ETH.

Inverter 4 is controlled by control device 10 and converts DC power from converter 3 and DC voltage converter 6 to three-phase AC power having a commercial frequency. As will be described later, each of converter 3, inverter 4, and DC voltage converter 6 includes a three-level circuit. Three-phase AC power generated by inverter 4 is supplied to load 42 through AC output filter 5.

AC output filter 5 is a three-phase LC filter circuit configured with a reactor 18 (reactor 18U, 18V, and 18W) and a capacitor 19 (capacitors 19U, 19V, and 19W). One terminal of each of reactors 18U, 18V, and 18W is connected to the corresponding one of three output nodes of inverter 4, and the other terminals thereof are connected to U-phase terminal TU, V-phase terminal TV, and W-phase terminal TW of three-phase four wire load 42.

One electrode of each of capacitors 19U, 19V, and 19W is connected to the other terminal of the corresponding one of reactors 18U, 18V, and 18W, and the other electrodes thereof are connected together to neutral point line L4. AC output filter 5 is a low-pass filter, allows three-phase AC power having a commercial frequency generated by inverter 4 to pass through load 42, and prevents a signal with a switching frequency generated in inverter 4 from passing through load 42. A neutral point terminal TNA of load 42 is connected to neutral point line L4. Load 42 is driven by three-phase AC power supplied from uninterruptible power supply apparatus U1.

Figure 2:
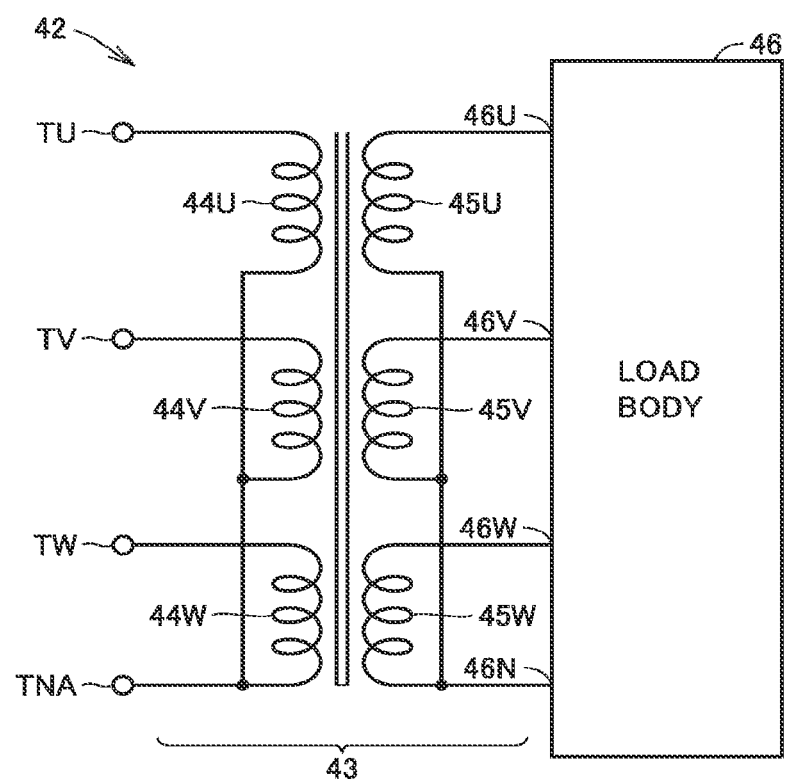
FIG. 2 is a circuit block diagram illustrating a configuration of a load shown in FIG. 1.

FIG. 2 is a circuit block diagram illustrating a configuration of load 42. In FIG. 2, load 42 includes a three-phase four-wire transformer 43 and a three-phase four-wire load body 46. Transformer 43 includes three primary windings 44U, 44V, and 44W and three secondary windings 45U, 45V, and 45W. One terminal of each of primary windings 44U, 44V, and 44W is connected to the corresponding one of U-phase terminal TU, V-phase terminal TV, and W-phase terminal TW of load 42, and the other terminals thereof are connected together to neutral point terminal TNA of load 42.

One terminal or each of secondary windings 45U, 45V, and 45W is connected to the corresponding one of U-phase terminal 46U, V-phase terminal 46V, and W-phase terminal 46W of load body 46, and the other terminals thereof are connected together to a neutral point terminal 46N of load body 46. Three-phase AC voltage supplied from uninterruptible power supply apparatus U1 is, for example, lowered by transformer 43 and supplied to load body 46 to drive load body 46.

Returning to FIG. 1, a battery B1 (power storage device) is connected between two low voltage-side nodes of DC voltage converter 6. DC voltage converter 6 is controlled by control device 10 and stores DC power generated by converter 3 into battery B1 in a sound state of commercial AC power supply 41. In doing so, control device 10 controls DC voltage converter 6 such that terminal-to-terminal voltage VB of battery B1 becomes reference battery voltage VBr (second reference voltage).

DC voltage converter 6 is controlled by control device 10 and supplies DC power of battery B1 to inverter 4 through DC lines L1 to L3 in a power failure of commercial AC power supply 41. In doing so, control device 10 controls DC voltage converter 6 such that voltage VDC=Ep+En that is the sum of DC voltages Ep and En becomes reference DC voltage VDCr and voltage ΔE=Ep−En that is the difference between DC voltages Ep and En becomes 0 V.

Instead of battery B1, a capacitor (for example, electric double layer capacitor) may be connected to DC voltage converter 6. In the present first embodiment, battery B1 is installed outside of uninterruptible power supply apparatus U1. However, battery B1 may be contained in uninterruptible power supply apparatus U1.

Instead of battery B1, a DC power supply source (for example, fuel cell) may be connected. In this case, in a sound state of commercial AC power supply 41, the operation of DC voltage converter 6 is stopped.

Voltage detector 31 detects instantaneous values of AC voltages VR, VS, and VT of the other terminals of switches 1R, 1S, and 1T and outputs three-phase voltage signals indicating three-phase AC voltages VR, VS, and VT to control device 10 and power failure detector 33. Current detector 32 detects instantaneous values of AC currents IR, IS, and IT flowing into three input nodes of converter 3 and outputs three-phase current signals indicating three-phase AC currents IR, IS, and IT to control device 10.

Power failure detector 33 determines whether a power failure of commercial AC power supply 41 has occurred based on the three-phase voltage signal from voltage detector 31 and outputs power failure signal PC indicating the determination result. In a sound state of commercial AC power supply 41, power failure signal PC goes to "L" level that is the inactive level. In a power failure of commercial AC power supply 41, power failure signal PC goes to "H" level that is the active level. Power failure signal PC is applied to control device 10.

Voltage detector 34 detects terminal-to-terminal voltage Ep of capacitor C1 and outputs a signal indicating the detected voltage Ep to control device 10. Voltage detector 35 detects terminal-to-terminal voltage En of capacitor C2 and outputs a signal indicating the detected voltage En to control device 10. Voltage detector 36 detects terminal-to-terminal voltage VB of battery B1 and outputs a signal indicating the detected voltage VB to control device 10. Current detector 37 detects current IB output from battery B1 and outputs a signal indicating the detected current IB to control device 10.

Control device 10 controls the operation of switch 1, converter 3, inverter 4, and DC voltage converter 6. As will be described in detail later, converter 3, inverter 4, and DC voltage converter 6 are configured with semiconductor switches including semiconductor switching elements. In the present first embodiment, IGBTs (Insulated Gate Bipolar Transistors) are used as semiconductor switching elements. In the present first embodiment, PWM (Pulse Width Modulation) control can be applied as a control method for the semiconductor switching elements.

Control device 10 receives three-phase voltage signals from voltage detector 31, three-phase current signals from current detector 32, a signal indicating voltage Ep detected by voltage detector 34, a signal indicating voltage En detected by voltage detector 35, power failure signal PC from power failure detector 33, a signal indicating voltage VB detected by voltage detector 36, a signal indicating current IB detected by current detector 37, and the like to perform PWM control.

FIG. 3 is a circuit diagram showing a configuration of converter 3 and inverter 4 shown in FIG. 1. In FIG. 3, converter 3 includes an R-phase arm 3R, an S-phase arm 3S, and a T-phase arm 3T. Inverter 4 includes a U-phase arm 4U, a V-phase arm 4V, and a W-phase arm 4W.

The arm of each phase (3R, 3S, 3T) of converter 3 and the arm of each phase (4U, 4V, 4W) of inverter 4 are configured as a three-level circuit and each include four IGBT devices and six diodes. Specifically, R-phase arm 3R includes IGBT devices Q1R to Q4R and diodes D1R to D6R. S-phase arm 3S includes IGBT devices Q1S to Q4S and diodes D1S to D6S. T-phase arm 3T includes IGBT devices Q1T to Q4T and diodes D1T to D6T. U-phase arm 4U includes IGBT devices Q1U to Q4U and diodes D1U to D6U. V-phase arm 4V includes IGBT devices Q1V to Q4V and diodes D1V to D6V. W-phase arm 4W includes IGBT devices Q1W to Q4W and diodes D1W to D6W.

Hereinafter, in order to generally describe the phase arms of converter 3 and the phase arms of inverter 4, reference signs R, S, T, U, V, W are collectively denoted by a reference sign "x". IGBT devices Q1x to Q4x are connected in series between DC lines L1 and L3. Diodes D1x to D4x are respectively connected in anti-parallel with IGBT devices Q1x to Q4x. Diode D5x is connected to the connection point of IGBT devices Q1x and Q2x and to DC line L2. Diode D6x is connected to the connection point of IGBT devices Q3x and Q4x and to DC line L2.

The cathode of diode D5x is connected to the connection point of IGBT devices Q1x and Q2x, and the anode of diode D5x is connected to DC line L2. The anode of diode D6x is connected to the connection point of IGBT devices Q3x and Q4x, and the cathode of diode D6x is connected to DC line L2. Diodes D1x to D4x function as free-wheel diodes, and diodes D5x and D6x function as clamp diodes.

Converter 3 includes three input nodes 3a to 3c. Input node 3a is connected to the other terminal of reactor 12R (FIG. 1) and connected to the connection point of IGBT devices Q2R and Q3R. Input node 3b is connected to the other terminal of reactor 12S (FIG. 1) and connected to the connection point of IGBT devices Q2S and Q3S. Input node 3c is connected to the other terminal of reactor 12T (FIG. 1) and connected to the connection point of IGBT devices Q2T and Q3T.

Inverter 4 includes three output nodes 4a to 4c. Output node 4a is connected to the connection point of IGBT devices Q2U and Q3U and connected to one terminal of reactor 18U (FIG. 1). Output node 4b is connected to the connection point of IGBT devices Q2V and Q3V and connected to one terminal of reactor 18V (FIG. 1). Output node 4c is connected to the connection point of IGBT devices Q2W and Q3W and connected to one terminal of reactor 18W (FIG. 1).

Figure 4:
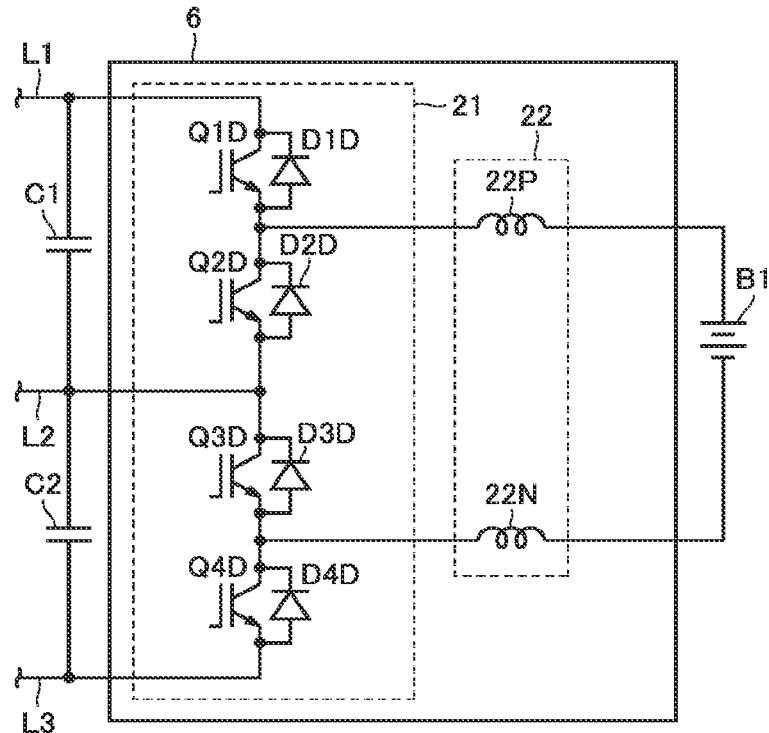
FIG. 4 is a circuit diagram showing a configuration of a DC voltage converter shown in FIG. 1.

FIG. 4 is a circuit diagram showing a configuration of DC voltage converter 6 shown in FIG. 1. In FIG. 4, DC voltage converter 6 includes a semiconductor switch 21 and a reactor 22. Semiconductor switch 21 is configured as a three-level circuit and includes IGBT devices Q1D to Q4D connected in series between DC lines L1 and L3 and diodes D1D to D4D respectively connected in anti-parallel with IGBT devices Q1D to Q4D. Reactor 22 includes reactors 22P and 22N. Reactor 22P is connected between the connection point of IGBT devices Q1D and Q2D and the positive electrode of battery B1. Reactor 22N is connected between the connection point of IGBT devices Q3D and Q4D and the negative electrode of battery B1.

Figure 5:
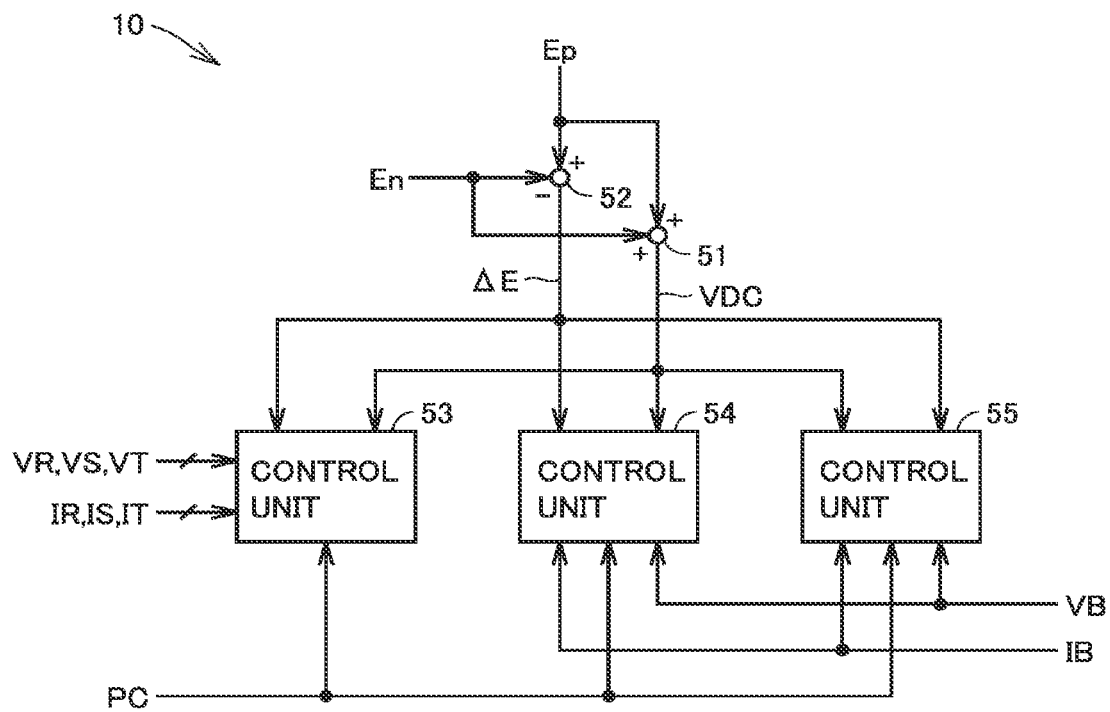
FIG. 5 is a block diagram showing a portion related to control of the converter and the DC voltage converter in a control device shown in FIG. 1.

FIG. 5 is a block diagram showing a portion related to control of converter 3 and DC voltage converter 6 in control device 10 (FIG. 1). In FIG. 5, control device 10 includes an adder 51, a subtracter 52, and control units 53 to 55. Adder 51 adds terminal-to-terminal voltages Ep and En of capacitors C1 and C2 detected by voltage detectors 34 and 35 to obtain DC voltage VDC=Ep+En between DC lines L1 and L3. Subtracter 52 subtracts terminal-to-terminal voltage En of capacitor C2 detected by voltage detector 35 from terminal-to-terminal voltage Ep of capacitor C1 detected by voltage detector 34 to obtain DC voltage ΔE=Ep−En that is the difference between terminal-to-terminal voltages Ep and En of capacitors C1 and C2. DC voltages VDC and ΔE are applied to each of control units 53 to 55.

Control unit 53 controls converter 3, based on power failure signal PC from power failure detector 33, signals indicating three-phase AC voltages VR, VS, and VT from voltage detector 31, signals indicating three-phase AC currents IR, IS, and IT from current detector 32, a signal indicating DC voltage VDC (first voltage) from adder 51, and a signal indicating DC voltage ΔE (second voltage) from subtracter 52.

Specifically, when power failure signal PC is "L" level that is the inactive level (in a sound state of commercial AC power supply 41), control unit 53 controls converter 3 such that three-phase AC voltages VR, VS, and VT are in phase with three-phase AC currents IR, IS, and IT, DC voltage VDC becomes reference DC voltage VDCr, and DC voltage ΔE becomes zero.

When power failure signal PC is "H" level that is the active level (in a power failure of commercial AC power supply 41), control unit 53 stops the operation of converter 3 if the absolute value of DC voltage ΔE is smaller than threshold voltage ETH.

When power failure signal PC is "H" level that is the active level (in a power failure of commercial AC power supply 41), control unit 53 controls converter 3 to reduce DC voltage ΔE if the absolute value of DC voltage ΔE is larger than threshold voltage ETH.

Control units 54 and 55 control DC voltage converter 6, based on power failure signal PC from power failure detector 33, a signal indicating battery voltage VB from voltage detector 36, a signal indicating DC current IB from current detector 37, a signal indicating DC voltage VDC from adder 51, and a signal indicating DC voltage ΔE from subtracter 52.

Specifically, control unit 54 is activated when power failure signal PC is "H" level that is the active level (in a power failure of commercial AC power supply 41) and controls DC voltage converter 6 such that current IB at the level corresponding to battery voltage VB flows from battery B1 to capacitors C1 and C2, DC voltage VDC becomes reference DC voltage VDCr, and DC voltage ΔE becomes zero.

Control unit 55 is activated when power failure signal PC is "L" level that is the inactive level (in a sound state of commercial AC power supply 41) and controls DC voltage converter 6 such that current IB at the level corresponding to DC voltage VDC flows from capacitors C1 and C2 to battery B1 and battery voltage VB becomes reference battery voltage VBr.

Figure 6:
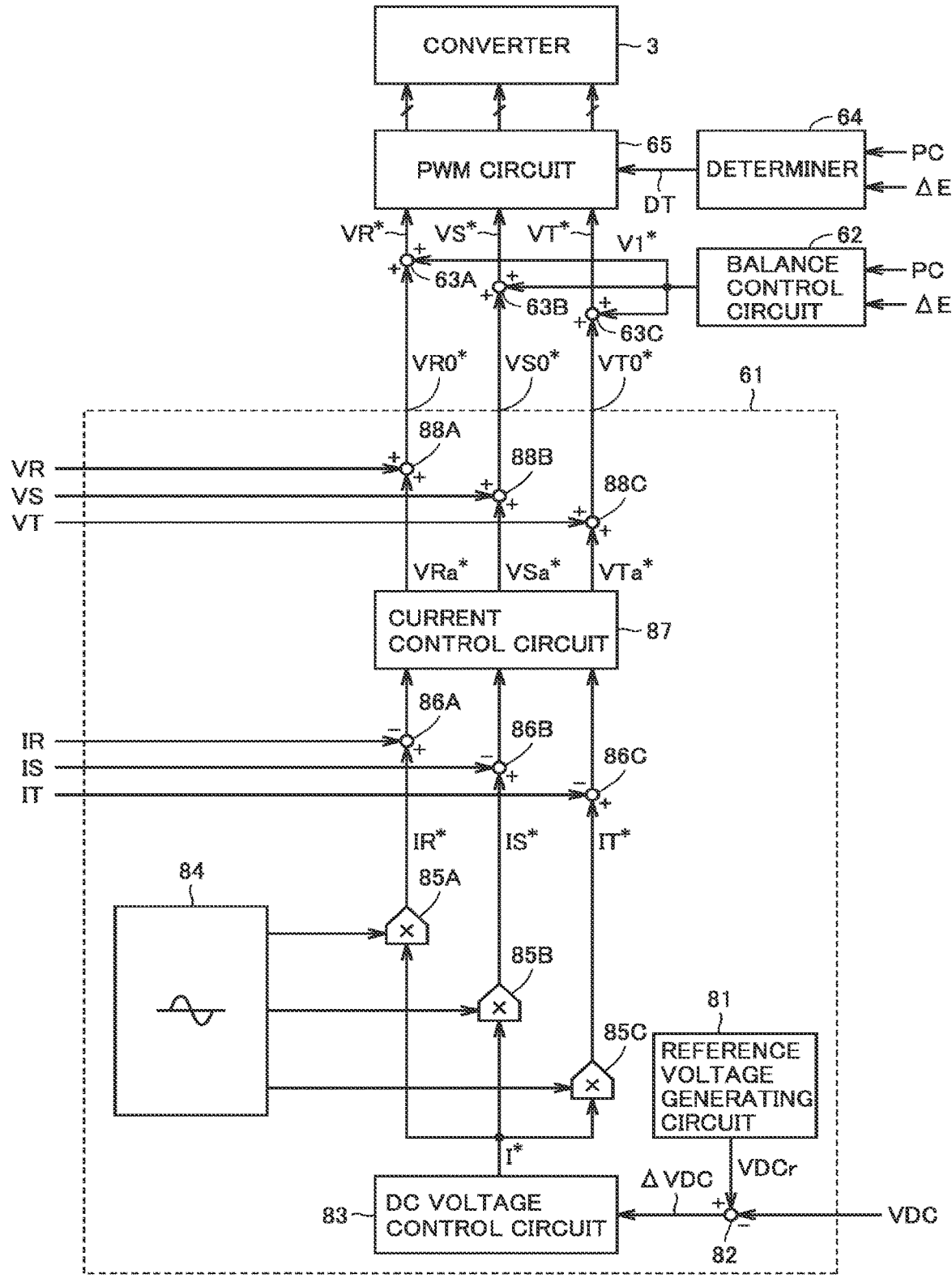
FIG. 6 is a block diagram showing a configuration of a control unit 53 shown in FIG. 5.

FIG. 6 is a block diagram showing a configuration of control unit 53 shown in FIG. 5. In FIG. 6, control unit 53 includes a voltage command generating circuit 61, a balance control circuit 62, adders 63A to 63C, a determiner 64, and a PWM circuit 65. Voltage command generating circuit 61 includes a reference voltage generating circuit 81, subtracters 82 and 86A to 86C, a DC voltage control circuit 83, a sinusoidal wave generating circuit 84, multipliers 85A to 85C, a current control circuit 87, and adders 88A to 88C.

Reference voltage generating circuit 81 generates reference DC voltage VDCr. Subtracter 82 calculates voltage ΔVDC=VDCr−VDC that is the difference between reference DC voltage VDCr and DC voltage VDC from adder 51 (FIG. 5). DC voltage control circuit 83 calculates current command value I* for controlling current flowing to the input side of converter 3 such that voltage ΔVDC becomes zero. DC voltage control circuit 83 calculates current command value I*, for example, by performing proportional operation or proportional integral operation of ΔVDC.

Sinusoidal wave generating circuit 84 outputs a sinusoidal wave signal in phase with R-phase voltage VR of commercial AC power supply 41, a sinusoidal wave signal in phase with S-phase voltage VS of commercial AC power supply 41, and a sinusoidal wave signal in phase with T-phase voltage VT of commercial AC power supply 41. Sinusoidal wave generating circuit 84 outputs three-phase sinusoidal wave signals even in a power failure of commercial AC power supply 41. Three sinusoidal wave signals are respectively input to multipliers 85A to 85C and multiplied by current command value I*. Current command values IR*, IS*, and IT* in phase with three-phase AC voltages VR, VS, and VT of commercial AC power supply 41 are thus generated.

Subtracter 86A calculates the difference between current command value IR* and R-phase current IR detected by current detector 32R. Subtracter 86B calculates the difference between current command value IS* and S-phase current IS detected by current detector 32S. Subtracter 86C calculates the difference between current command value IT* and T-phase current IT detected by current detector 32T.

Current control circuit 87 generates voltage command values VRa*, VSa*, and VTa* as voltages to be applied to reactor 12 such that all of the difference between current command value IR* and R-phase current IR, the difference between current command value IS* and S-phase current IS, and the difference between current command value IT* and T-phase current IT become zero. Current control circuit 87 generates a voltage command value, for example, by amplifying the difference between the current command value and the current value detected by the current detector in accordance with proportional control or proportional integral control.

Adder 88A adds voltage command value VRa* to R-phase voltage VR detected by voltage detector 31 to generate voltage command value VR0*. Adder 88B adds voltage command value VSa* to S-phase voltage VS detected by voltage detector 31 to generate voltage command value VS0*. Adder 88C adds voltage command value VTa* to T-phase voltage VT detected by voltage detector 31 to generate voltage command value VT0*.

In this way, voltage command generating circuit 61 receives three-phase AC voltages VR, VS, and VT detected by voltage detector 31, three-phase AC currents IR, IS, and IT detected by current detector 32, and DC voltage VDC calculated by adder 51 and generates voltage command values VR0*, VS0*, and VT0* corresponding to R phase, S phase, and T phase, respectively.

Balance control circuit 62 generates voltage command value V1*, based on power failure signal PC from power failure detector 33 (FIG. 1) and DC voltage ΔE=Ep−En from subtracter 52 (FIG. 5). For example, balance control circuit 62 generates voltage command value V1* by performing proportional operation or proportional integral operation of ΔE.

When power failure signal PC is "L" level that is the inactive level and ΔE=Ep−En>0, voltage command value V1* is generated such that the charging time of capacitor C1 is shorter than the charging time of capacitor C2. When power failure signal PC is "L" level that is the inactive level and ΔE=Ep−En<0, voltage command value V1* is generated such that the charging time of capacitor C1 is longer than the charging time of capacitor C2.

When power failure signal PC is "H" level that is the active level and ΔE=Ep−En>0, voltage command value V1* is generated such that the discharging time of capacitor C1 is longer than the discharging time of capacitor C2. When power failure signal PC is "H" level that is the active level and ΔE=Ep−En<0, voltage command value V1* is generated such that the discharging time of capacitor C1 is shorter than the discharging time of capacitor C2.

Adder 63A adds voltage command values VR0* and V1* to generate voltage command value VR*. Adder 63B adds voltage command values VS0* and V1* to generate voltage command value VS*. Adder 63C adds voltage command values VT0* and V1* to generate voltage command value VT*.

Determiner 64 generates signal DT, based on power failure signal PC from power failure detector 33 (FIG. 1) and DC voltage ΔE from subtracter 52 (FIG. 5). When power failure signal PC is "L" level that is the inactive level (in a sound state of commercial AC power supply 41), signal DT is brought to "H" level that is the active level.

When power failure signal PC is "H" level that is the active level (in a power failure of commercial AC power supply 41), signal DT is brought to "L" level that is the inactive level if DC voltage ΔE is smaller than threshold voltage ETH. When power failure signal PC is "H" level that is the active level (in a power failure of commercial AC power supply 41), signal DT is brought to "H" level that is the active level if DC voltage ΔE is larger than threshold voltage ETH.

PWM circuit 65 is activated when signal DT is "H" level that is the active level and outputs a signal for making three-phase AC voltages VR, VS, and VT detected by voltage detector 31 equal to voltage command values VR*, VS*, and VT*, respectively, based on voltage command values VR*, VS*, and VT*. This signal is a signal for driving four IGBT devices included in each phase arm of converter 3.

When signal DT is "L" level that is the inactive level, PWM circuit 65 is inactivated and turns off four IGBT devices included in each phase arm of converter 3. The operation of converter 3 is thus stopped.

Converter 3 is controlled by control unit 53 having the configuration above, whereby three-phase AC currents IR, IS, and IT become in phase with three-phase AC voltages VR, VS, and VT of commercial AC power supply 41 and become sinusoidal currents, thereby bringing the power factor to almost one.

Figure 7:
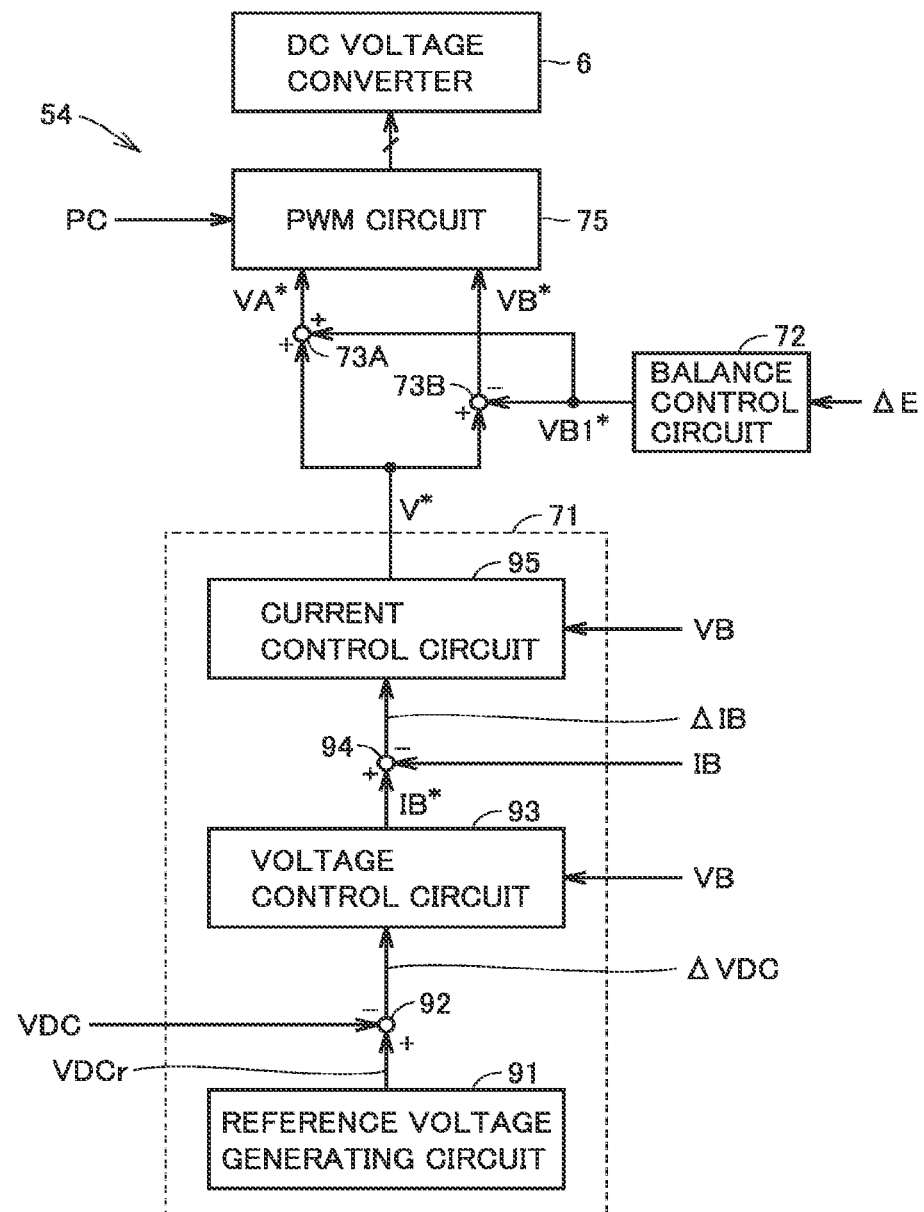
FIG. 7 is a block diagram showing a configuration of a control unit 54 shown in FIG. 5.

FIG. 7 is a block diagram showing a configuration of control unit 54 shown in FIG. 5. In FIG. 7, control unit 54 includes a voltage command generating circuit 71, a balance control circuit 72, an adder 73A, a subtracter 73B, and a PWM circuit 75. Voltage command generating circuit 71 includes a reference voltage generating circuit 91, subtracters 92 and 94, a voltage control circuit 93, and a current control circuit 95.

Reference voltage generating circuit 91 generates reference DC voltage VDCr. Subtracter 92 calculates voltage ΔVDC that is the difference between reference DC voltage VDCr and DC voltage VDC detected by adder 51 (FIG. 5). Voltage control circuit 93 calculates current command value IB* at the level corresponding to voltage ΔVDC, based on terminal-to-terminal voltage VB of battery B1 detected by voltage detector 36 (FIG. 1). Voltage control circuit 93 calculates current command value IB*, for example, by performing proportional operation or proportional integral operation of ΔVDC. Subtracter 94 obtains deviation ΔIB=IB*−IB between current command value IB* generated by voltage control circuit 93 and current value IB of battery B1 detected by current detector 37 (FIG. 1). Current control circuit 95 generates voltage command value V* based on deviation ΔIB between current command value IB* and current value IB.

In this way, voltage command generating circuit 71 receives battery voltage VB detected by voltage detector 36, battery current IB detected by current detector 37, and DC voltage VDC calculated by adder 51 and generates voltage command value V* for controlling terminal-to-terminal voltages Ep and En of capacitors C1 and C2 to a predetermined voltage.

Balance control circuit 72 receives DC voltage ΔE=Ep−En from subtracter 52 (FIG. 5) and generates voltage command value VB1*. For example, balance control circuit 72 generates voltage command value VB1* by performing proportional operation or proportional integral operation of DC voltage ΔE. For example, when ΔE>0, balance control circuit 72 sets voltage command value VB1* to a negative value. On the other hand, when ΔE<0, balance control circuit 72 sets voltage command value VB1* to a positive value.

Adder 73A adds voltage command values V* and VB1* to generate voltage command value VA*. Subtracter 73B subtracts voltage command value VB1* from voltage command value V* to generate voltage command value VB*.

Voltage command values VA* and VB* are command values for controlling voltages of the upper arm and the lower arm of semiconductor switch 21, respectively, and command values for voltages Ep and En for bringing the difference ΔE between voltages Ep and En to zero. Balance control circuit 72, adder 73A, and subtracter 73B constitute a command value generating circuit that generates voltage command values VA* and VB* for controlling voltages Ep and En, respectively, such that DC voltage ΔE=Ep−En becomes zero, based on DC voltage ΔE and voltage command value V*.

PWM circuit 75 is activated when power failure signal PC is "H" level that is the active level (in a power failure of commercial AC power supply 41) and outputs a signal for driving four IGBT devices included in semiconductor switch 21, based on voltage command values VA* and VB*. DC voltage converter 6 is controlled by a signal from PWM circuit 75 and supplies DC power of battery B1 to inverter 4.

When power failure signal PC is "L" level that is the inactive level (in a sound state of commercial AC power supply 41), PWM circuit 75 is inactivated and does not perform PWM control of DC voltage converter 6. In a sound state of commercial AC power supply 41, DC voltage converter 6 is controlled by control unit 55 (FIG. 5) to store DC power into battery B1.

Figure 8:
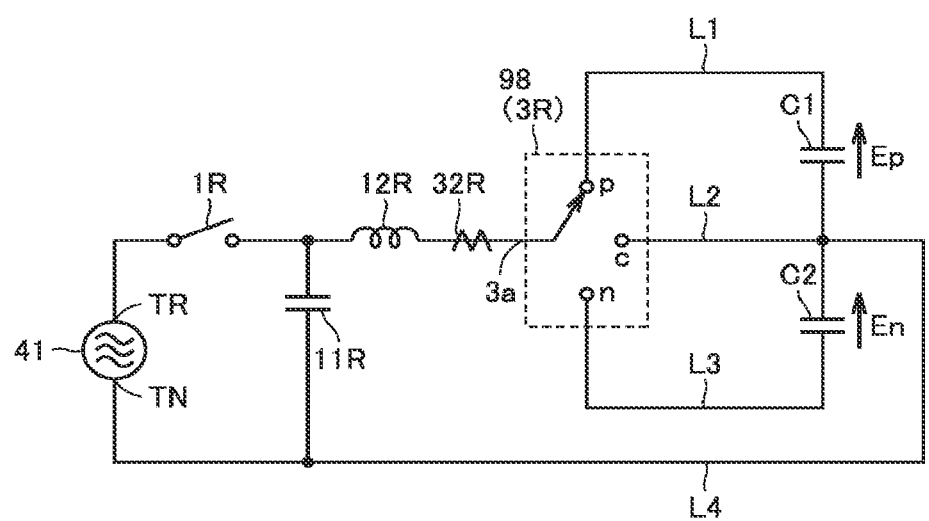
FIG. 8 is an equivalent circuit diagram showing a configuration of one phase of the converter shown in FIG. 3.

FIG. 8 is an equivalent circuit diagram showing a configuration of one phase of converter 3 shown in FIG. 3. In FIG. 8, as one phase arm, R-phase arm 3R is denoted as switch 98. Switch 98 includes a common terminal connected to input node 3a of converter 3 and three switch terminals respectively connected to DC lines L1, L2, and L3. In this switch 98, the common terminal is connected to any one of three switch terminals.

In this equivalent circuit, for example, AC output in the inverter operation has one of three potential states (p, c, n). Here, p, c, and n are voltages on DC lines L1, L2, and L3, respectively. The voltages of DC lines L1, L2, and L3 are a positive voltage, a neutral point voltage, and a negative voltage, respectively. The neutral point voltage is, for example, ground voltage (0 V).

Figure 9:
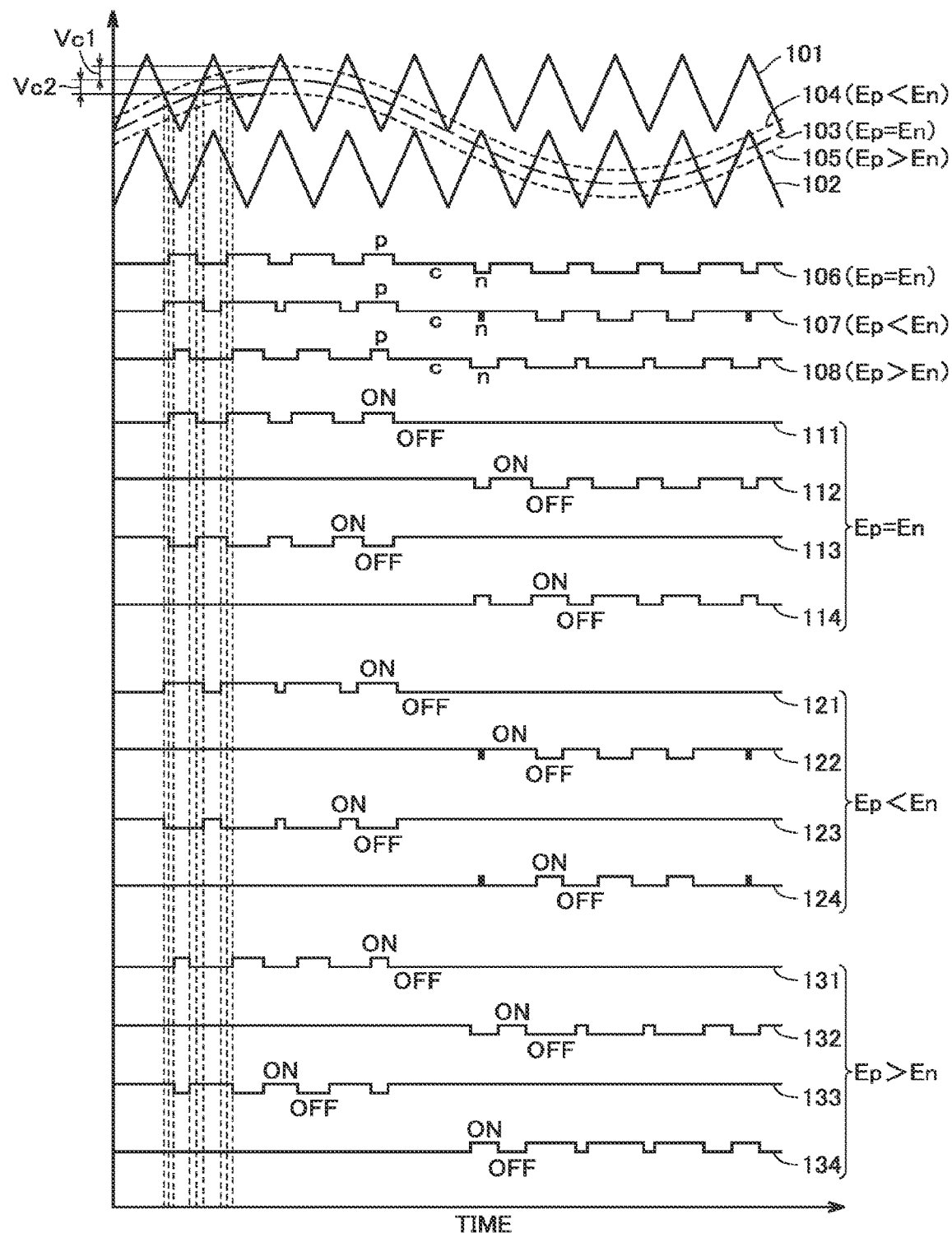
FIG. 9 is a time chart showing the operation of control unit 53 shown in FIG. 6.

FIG. 9 is a time chart showing the operation of control unit 53 shown in FIG. 6. FIG. 9 shows PWM control of one phase (for example, R phase) of converter 3 (three-level PWM converter) in a sound state of commercial AC power supply 41. In the following description, four IGBT devices included in each phase arm are denoted by reference signs Q1 to Q4.

In FIG. 9, voltage command signal 103 is a voltage command signal (VR0*) in a state not corrected by balance control circuit 62 (FIG. 6). Voltage command signal 103 is set to a sinusoidal wave signal in phase with R-phase voltage VR of commercial AC power supply 41 by sinusoidal wave generating circuit 84 (FIG. 6). In PWM circuit 65, the levels of voltage command signal 103 and reference signals 101 and 102 are compared, whereby the switching patterns of four IGBT devices included in R phase (similarly, in S phase and T phase) are determined. The switching patterns of IGBT devices Q1 to Q4 of the phase arm in this case are switching patterns 111 to 114, and the output voltage of converter 3 is phase voltage 106.

Each of reference signals 101 and 102 is a triangular wave signal having a switching frequency sufficiently higher than a commercial frequency. The phase and the amplitude of reference signal 101 match the phase and the amplitude of reference signal 102. Reference signal 101 changes between 0 V and a positive peak voltage. Reference signal 102 changes between a negative peak voltage and 0 V. The amplitude of voltage command signal 103 is smaller than the sum of amplitudes of reference signals 101 and 102.

When the level of voltage command signal 103 is higher than the level of reference signal 101, IGBT devices Q1 and Q2 are turned on, and IGBTs Q3 and Q4 are turned off. When the level of voltage command signal 103 is between the levels of reference signals 101 and 102, IGBT devices Q2 and Q3 are turned on, and IGBTs Q1 and Q4 are turned off. When the level of voltage command signal 103 is lower than the level of reference signal 102, IGBT devices Q3 and Q4 are turned on, and IGBTs Q1 and Q2 are turned off.

Voltage command signal 104 is a voltage command signal (VR*) corrected by balance control circuit 62 when Ep<En and is obtained by adding adjustment signal Vc1 to voltage command signal 103. In PWM circuit 65, the levels of voltage command signal 104 and reference signals 101 and 102 are compared, whereby the switching patterns of four IGBT devices included in R phase (similarly, in S phase and T phase) are determined. The switching patterns of IGBT devices Q1 to Q4 of the phase arm in this case are switching patterns 121 to 124, and the output voltage of converter 3 is phase voltage 107.

When the level of voltage command signal 104 is higher than the level of reference signal 101, IGBT devices Q1 and Q2 are turned on, and IGBTs Q3 and Q4 are turned off. When the level of voltage command signal 104 is between the levels of reference signals 101 and 102, IGBT devices Q2 and Q3 are turned on, and IGBTs Q1 and Q4 are turned off. When the level of voltage command signal 104 is lower than the level of reference signal 102, IGBT devices Q3 and Q4 are turned on, and IGBTs Q1 and Q2 are turned off.

As can be understood from FIG. 9, when Ep<En (switching patterns 121 to 124), the ON time of IGBT devices Q1 and Q2 (the charging time of capacitor C1) is longer, and the ON time of IGBT devices Q3 and Q4 (the charging time of capacitor C2) is shorter, compared with when Ep=En (switching patterns 111 to 114). Therefore, $\Delta E=Ep-En$ is reduced.

Voltage command signal 105 is a voltage command signal (VR*) corrected by balance control circuit 62 when Ep>En and is obtained by adding adjustment signal Vc2 to voltage command signal 103. In PWM circuit 65, the levels of voltage command signal 105 and reference signals 101 and 102 are compared, whereby the switching patterns of four IGBT devices included in R phase (similarly, in S phase and T phase) are determined. The switching patterns of IGBT devices Q1 to Q4 of the phase arm in this case are switching patterns 131 to 134, and the output voltage of converter 3 is phase voltage 108.

When the level of voltage command signal 105 is higher than the level of reference signal 101, IGBT devices Q1 and Q2 are turned on, and IGBTs Q3 and Q4 are turned off. When the level of voltage command signal 105 is between the levels of reference signals 101 and 102, IGBT devices Q2 and Q3 are turned on, and IGBTs Q1 and Q4 are turned off. When the level of voltage command signal 105 is lower than the level of reference signal 102, IGBT devices Q3 and Q4 are turned on, and IGBTs Q1 and Q2 are turned off.

As can be understood from FIG. 9, when Ep>En (switching patterns 131 to 134), the ON time of IGBT devices Q1 and Q2 (the charging time of capacitor C1) is shorter, and the ON time of IGBT devices Q3 and Q4 (the charging time of capacitor C2) is longer, compared with when Ep=En (switching patterns 111 to 114). Therefore, $\Delta E=Ep-En$ is reduced.

Voltage command signal 103 corresponds to the voltage command value (VR0*, VS0*, VT0*) from voltage command generating circuit 61 (FIG. 6), and each of adjustment signals Vc1 and Vc2 corresponds to voltage command value V1* from balance control circuit 62. Voltage command value V1* is positive when Ep<En and is negative when Ep>En.

Figure 10:
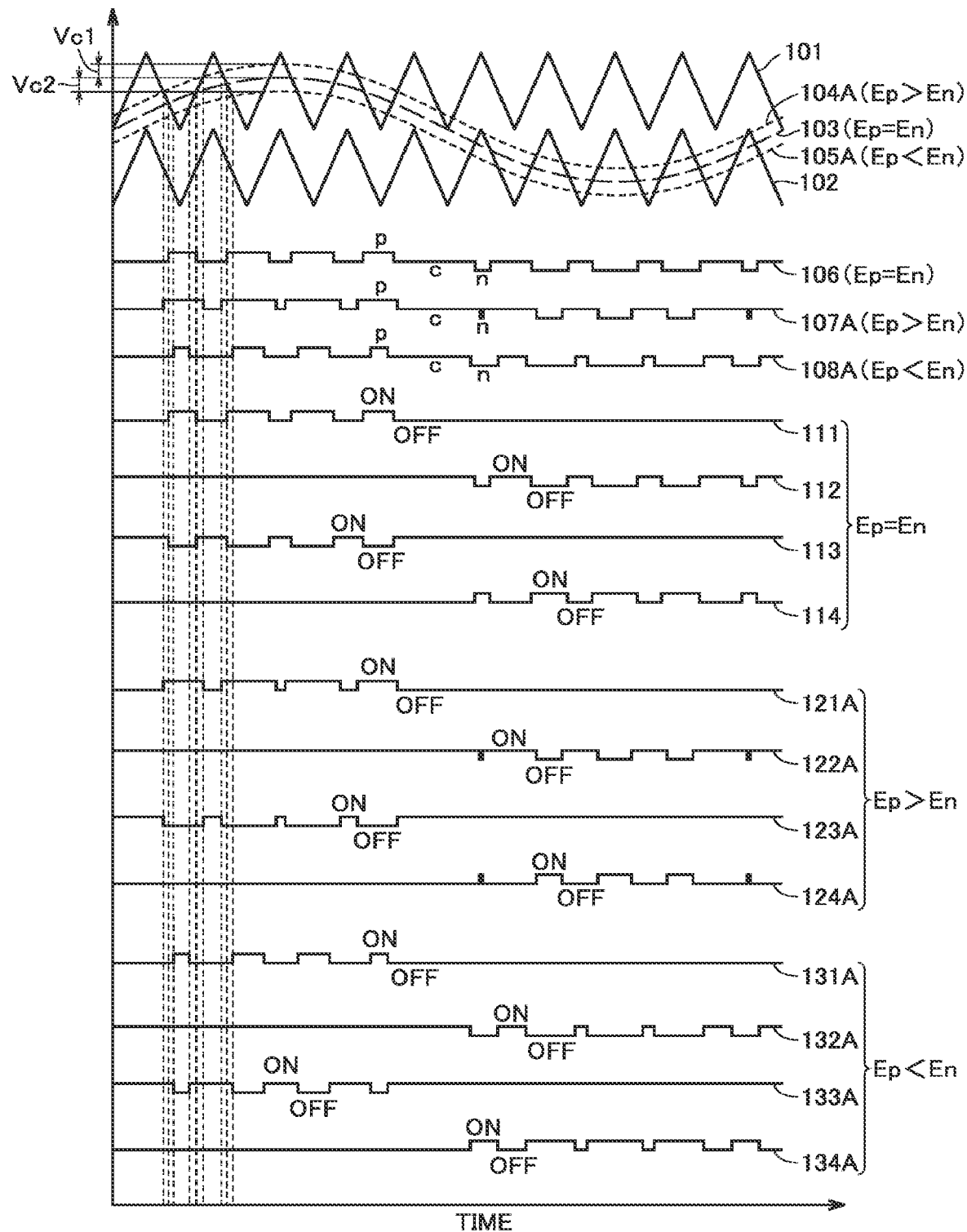
FIG. 10 is another time chart showing the operation of control unit 53 shown in FIG. 6.

FIG. 10 is another time chart showing the operation of control unit 53 shown in FIG. 6. FIG. 10 shows PWM control of one phase (for example, R phase) of converter 3 (three-level PWM converter) when the absolute value of $\Delta E$ exceeds threshold voltage ETH in a power failure of commercial AC power supply 41.

In FIG. 10, voltage command signal 103 is a voltage command signal (VR0*) in a state not corrected by balance control circuit 62 (FIG. 6). Voltage command signal 103 is set to a sinusoidal wave signal in phase with R-phase voltage VR of commercial AC power supply 41 by sinusoidal wave generating circuit 84 (FIG. 6). In PWM circuit 65, the levels of voltage command signal 103 and reference signals 101 and 102 are compared, whereby the switching patterns of four IGBT devices included in R phase (similarly, in S phase and T phase) are determined. The switching patterns of IGBT devices Q1 to Q4 of the phase arm in this case are switching patterns 111 to 114, and the output voltage of converter 3 is phase voltage 106.

Voltage command signal 104A is a voltage command signal (VR*) corrected by balance control circuit 62 when Ep>En and is obtained by adding adjustment signal Vc1 to voltage command signal 103. In PWM circuit 65, the levels of voltage command signal 104A and reference signals 101 and 102 are compared, whereby the switching patterns of four IGBT devices included in R phase (similarly, in S phase and T phase) are determined. The switching patterns of IGBT devices Q1 to Q4 of the phase arm in this case are switching patterns 121A to 124A, and the output voltage of converter 3 is phase voltage 107A.

When the level of voltage command signal 104A is higher than the level of reference signal 101, IGBT devices Q1 and Q2 are turned on, and IGBTs Q3 and Q4 are turned off. When the level of voltage command signal 104A is between the levels of reference signals 101 and 102, IGBT devices Q2 and Q3 are turned on, and IGBTs Q1 and Q4 are turned off. When the level of voltage command signal 104A is lower than the level of reference signal 102, IGBT devices Q3 and Q4 are turned on, and IGBTs Q1 and Q2 are turned off.

As can be understood from FIG. 10, when Ep>En (switching patterns 121A to 124A), the ON time of IGBT devices Q1 and Q2 (the discharging time of capacitor C1) is longer, and the ON time of IGBT devices Q3 and Q4 (the discharging time of capacitor C2) is shorter, compared with when Ep=En (switching patterns 111 to 114). Therefore, $\Delta E=Ep-En$ is reduced.

Voltage command signal 105A is a voltage command signal (VR*) corrected by balance control circuit 62 when Ep<En and is obtained by adding adjustment signal Vc2 to voltage command signal 103. In PWM circuit 65, the levels of voltage command signal 105A and reference signals 101 and 102 are compared, whereby the switching patterns of four IGBT devices included in R phase (similarly, in S phase and T phase) are determined. The switching patterns of IGBT devices Q1 to Q4 of the phase arm in this case are switching patterns 131A to 134A, and the output voltage of converter 3 is phase voltage 108A.

When the level of voltage command signal 105A is higher than the level of reference signal 101, IGBT devices Q1 and Q2 are turned on, and IGBTs Q3 and Q4 are turned off. When the level of voltage command signal 105A is between the levels of reference signals 101 and 102, IGBT devices Q2 and Q3 are turned on, and IGBTs Q1 and Q4 are turned off. When the level of voltage command signal 105A is lower than the level of reference signal 102, IGBT devices Q3 and Q4 are turned on, and IGBTs Q1 and Q2 are turned off.

As can be understood from FIG. 10, when Ep<En (switching patterns 131A to 134A), the ON time of IGBT devices Q1 and Q2 (the discharging time of capacitor C1) is shorter, and the ON time of IGBT devices Q3 and Q4 (the discharging time of capacitor C2) is longer, compared with when Ep=En (switching patterns 111 to 114). Therefore, ΔE=Ep−En is reduced.

Voltage command signal 103 corresponds to a voltage command value (VR0*, VS0*, VT0*) from voltage command generating circuit 61 (FIG. 6), and each of adjustment signals Vc1 and Vc2 corresponds to voltage command value V1* from balance control circuit 62. Voltage command value V1* is positive when Ep>En and is negative when Ep<En.

It can be understood from FIG. 9 and FIG. 10 that the switching patterns of the IGBT devices of the phase arm have three modes. FIG. 11 is a diagram showing the switching patterns of four IGBT devices included in each phase arm of converter 3 shown in FIG. 3. FIGS. 12(A) to 12(C) are circuit diagrams showing the operation of each phase arm in the modes shown in FIG. 11.

FIG. 12(A) shows Mode 1. In Mode 1, IGBT devices Q1 and Q2 turn on and the positive-side smoothing capacitor C1 is charged (or discharged). FIG. 12(B) shows Mode 2. In Mode 2, IGBT devices Q2 and Q3 turn on, and the power storage states of positive-side smoothing capacitor C1 and negative-side smoothing capacitor C2 are not so different. FIG. 12(C) shows Mode 3. In Mode 3, IGBT devices Q3 and Q4 turn on, and negative-side smoothing capacitor C2 is charged (or discharged). In FIGS. 12(A) and 12(C), the arrows show the direction of current flowing during charging. During discharging, current flows in the opposite direction to the arrows.

The balance control by converter 3 in a sound state of commercial AC power supply 41 will now be described. In FIG. 9, when Ep<En, in order to achieve voltage balance between smoothing capacitors C1 and C2, balance control circuit 62 adds adjustment signal Vc1 to voltage command signal 103 to adjust the voltage command signal to voltage command signal 104.

In PWM circuit 65, the levels of voltage command signal 104 and reference signals 101 and 102 are compared, whereby the switching patterns 121 to 124 of IGBT devices Q1 to Q4 are obtained. In a time period in which voltage command signal 104 is positive, positive-side smoothing capacitor C1 is charged. In a time period in which voltage command signal 104 is negative, negative-side smoothing capacitor C2 is charged.

When the switching pattern (111 to 114) without correction is compared with the switching pattern (121 to 124) with correction, the charging period of positive-side smoothing capacitor C1 is longer than the charging period of negative-side smoothing capacitor C2, and therefore voltage Ep can be raised relative to voltage En. Since adjustment signal Vc1 is output such that Ep=En is achieved, the voltages of smoothing capacitors C1 and C2 are matched and balanced.

In FIG. 9, when Ep>En, in order to achieve voltage balance between smoothing capacitors C1 and C2, balance control circuit 62 adds adjustment signal Vc2 to voltage command signal 103 to adjust the voltage command signal to voltage command signal 105. In PWM circuit 65, the levels of voltage command signal 105 and reference signals 101 and 102 are compared, whereby the switching patterns 131 to 134 of IGBT devices Q1 to Q4 are obtained.

In a time period in which voltage command signal 104 is positive, positive-side smoothing capacitor C1 is charged. In a time period in which voltage command signal 104 is negative, negative-side smoothing capacitor C2 is charged. When the switching pattern (111 to 114) without correction is compared with the switching pattern (131 to 134) with correction, the charging period of negative-side smoothing capacitor C2 is longer than the charging period of positive-side smoothing capacitor C1, and therefore voltage En can be raised relative to voltage Ep. Since adjustment signal Vc2 is output such that Ep=En is achieved, the voltages of smoothing capacitors C1 and C2 are matched and balanced.

The balance control by converter 3 when the absolute value of ΔE exceeds threshold voltage ETH in a power failure of commercial AC power supply 41 will now be described. In FIG. 10, when Ep>En, in order to achieve voltage balance between smoothing capacitors C1 and C2, balance control circuit 62 adds adjustment signal Vc1 to voltage command signal 103 to adjust the voltage command signal to voltage command signal 104A.

In PWM circuit 65, the levels of voltage command signal 104A and reference signals 101 and 102 are compared, whereby the switching patterns 121A to 124A of IGBT devices Q1 to Q4 are obtained. In a time period in which voltage command signal 104A is positive, positive-side smoothing capacitor C1 is discharged. In a time period in which voltage command signal 104A is negative, negative-side smoothing capacitor C2 is discharged.

When the switching pattern (111 to 114) without correction is compared with the switching pattern (121A to 124A) with correction, the discharging period of positive-side smoothing capacitor C1 is longer than the discharging period of negative-side smoothing capacitor C2, and therefore voltage Ep can be lowered relative to voltage En. Since adjustment signal Vc1 is output such that Ep=En is achieved, the voltages of smoothing capacitors C1 and C2 are matched and balanced.

In FIG. 10, when Ep<En, in order to achieve voltage balance between smoothing capacitors C1 and C2, balance control circuit 62 adds adjustment signal Vc2 to voltage command signal 103 to adjust the voltage command signal to voltage command signal 105A. In PWM circuit 65, the levels of voltage command signal 105A and reference signals 101 and 102 are compared, whereby the switching patterns 131A to 134A of IGBT devices Q1 to Q4 are obtained.

In a time period in which voltage command signal 104A is positive, positive-side smoothing capacitor C1 is discharged. In a time period in which voltage command signal 104A is negative, negative-side smoothing capacitor C2 is charged. When the switching pattern (111 to 114) without correction is compared with the switching pattern (131A to 134A) with correction, the discharging period of negative-side smoothing capacitor C2 is longer than the discharging period of negative-side smoothing capacitor C1, and therefore voltage En can be lowered relative to voltage Ep. Since adjustment signal Vc2 is output such that Ep=En is achieved, the voltages of smoothing capacitors C1 and C2 are matched and balanced.

Figure 12:
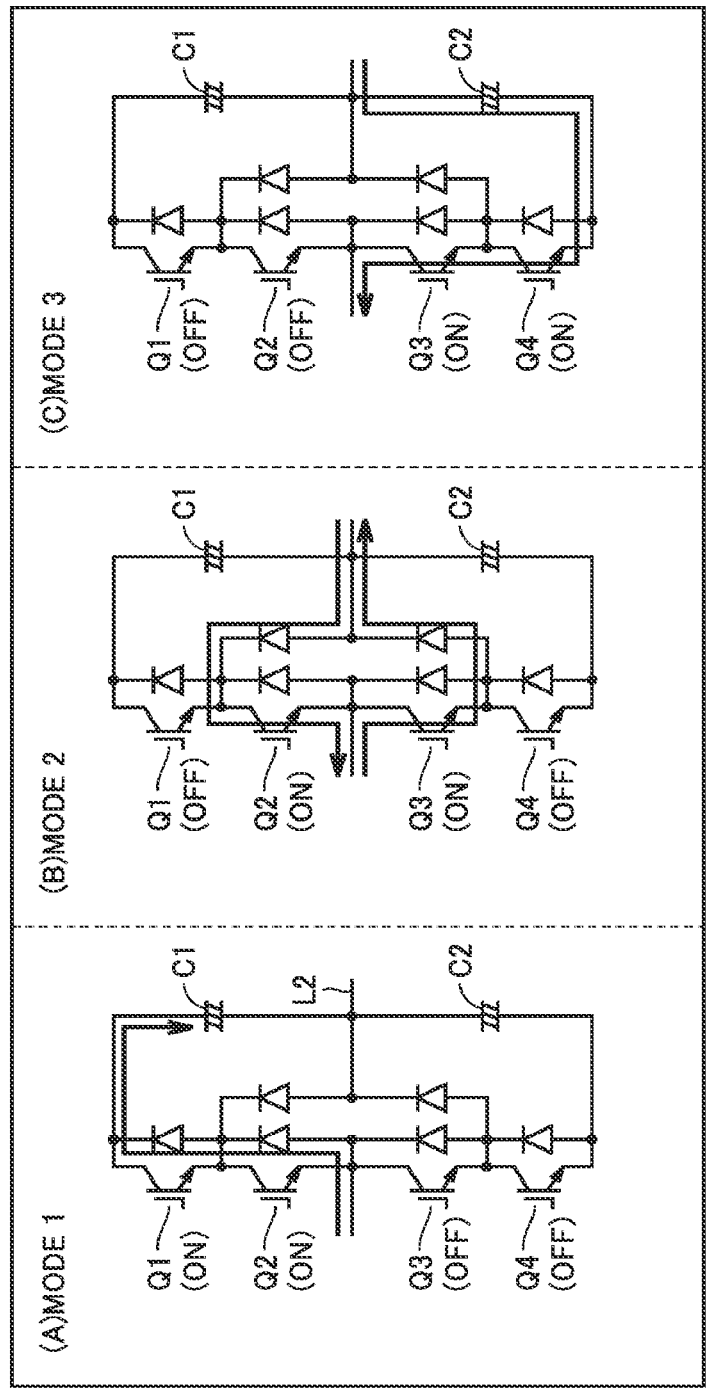
FIG. 12 is a circuit diagram showing the operation of each phase arm in the modes shown in FIG. 11.
Figure 13:
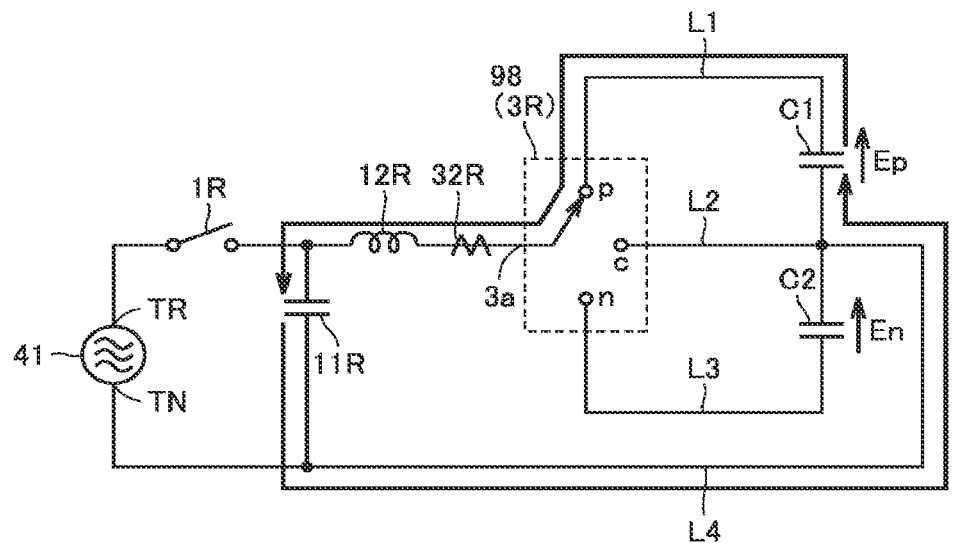
FIG. 13 is an equivalent circuit diagram showing the operation of one phase of the converter in a power failure of a commercial AC power supply.
Figure 14:
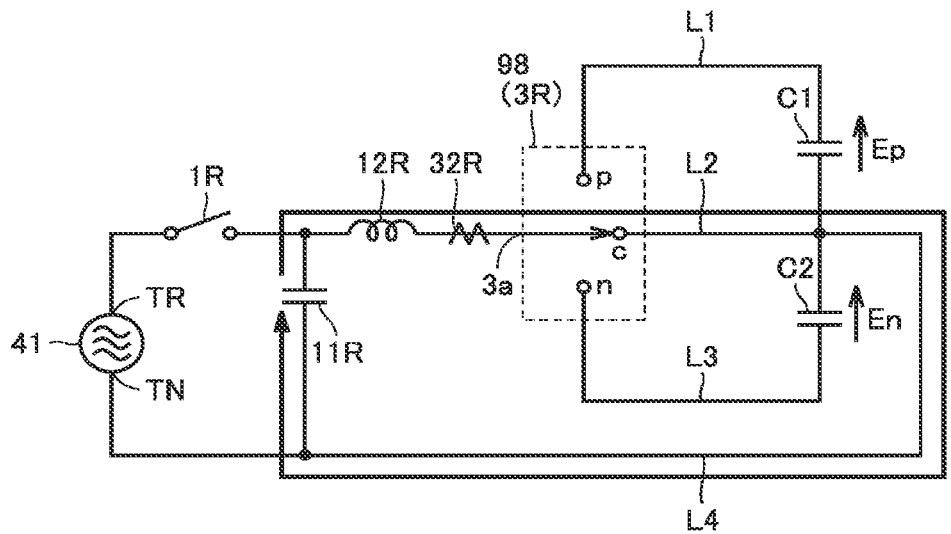
FIG. 14 is another equivalent circuit diagram showing the operation of one phase of the converter in a power failure of the commercial AC power supply.
Figure 15:
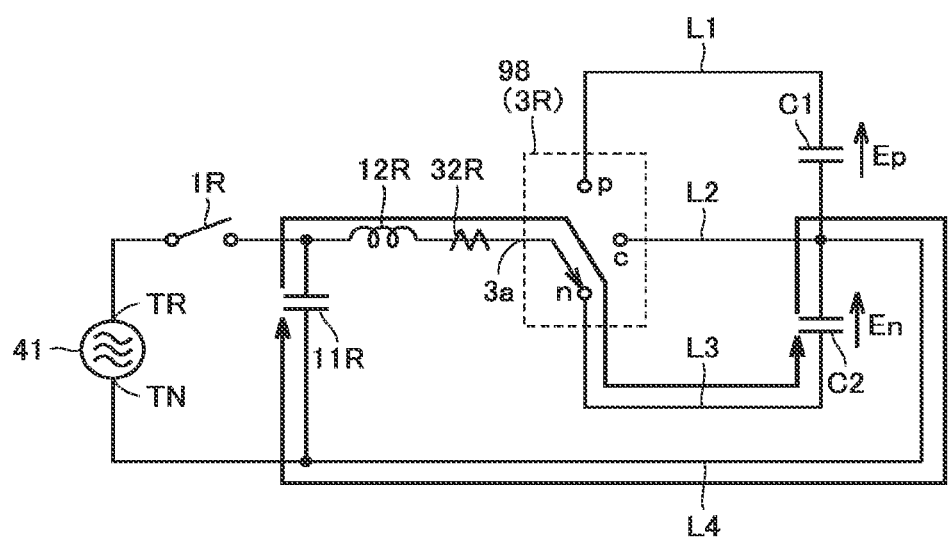
FIG. 15 is yet another equivalent circuit diagram showing the operation of one phase of the converter in a power failure of the commercial AC power supply.

FIG. 13 to FIG. 15 are equivalent circuit diagrams showing the operation of one phase of converter 3 when the absolute value of ΔE exceeds threshold voltage ETH in a power failure of commercial AC power supply 41. In FIG. 13 to FIG. 15, R-phase arm 3R is shown as one phase arm and R-phase arm 3R is denoted as switch 98. FIG. 13 to FIG. 15 show the operation of one phase of converter 3 in Mode 1 to Mode 3, respectively (FIG. 11, FIG. 12).

When power failure signal PC goes to "H" level that is the active level and the absolute value of DC voltage ΔE=Ep−En exceeds threshold voltage ETH, output signal DT of determiner 64 (FIG. 6) goes to "H" level that is the active level, and PWM circuit 65 is activated. For example, when Ep>En, in the activated PWM circuit 65, the levels of voltage command signal 104A and reference signals 101 and 102 are compared, whereby the switching patterns 121A to 124A (FIG. 10) of IGBT devices Q1 to Q4 are obtained.

In a power failure of commercial AC power supply 41, switch 1R is turned off, and commercial AC power supply 41 is electrically cut off from capacitor 11R and reactor 12R of AC input filter 2. In a time period in which voltage command signal 103 is positive, Mode 1 and Mode 2 are alternately executed.

In Mode 1, as shown in FIG. 13, switch 98 (R-phase arm 3R) connects DC line L1 and input node 3a, and current flows from the positive electrode of capacitor C1 to the negative electrode of capacitor C1 through DC line L1, switch 98 (R-phase arm 3R), input node 3a, reactor 12R, capacitor 11R, and neutral point line L4. Since the capacitance value of capacitor C1 is sufficiently larger than the capacitance value of capacitor 11R, terminal-to-terminal voltage Ep of capacitor C1 slightly lowers.

In Mode 2, as shown in FIG. 14, switch 98 (R-phase arm 3R) connects DC line L2 and input node 3a, current flows from one electrode of capacitor 11R to the other electrode of capacitor 11R through reactor 12R, input node 3a, switch 98 (R-phase arm 3R), DC line L2, and neutral point line L4, and the terminal-to-terminal voltage of capacitor 11R is reset to 0 V. In a time period in which voltage command signal 104A is positive, therefore, Mode 1 and Mode 2 are alternately executed, so that capacitor C1 is discharged, and the terminal-to-terminal voltage Ep of capacitor C1 gradually lowers.

In a time period in which voltage command signal 104A is negative, Mode 3 and Mode 2 are alternately executed. In Mode 3, as shown in FIG. 15, switch 98 (R-phase arm 3R) connects DC line L3 and input node 3a, and current flows from the positive electrode of capacitor C2 to the negative electrode of capacitor C2 through neutral point line L4, capacitor 11R, reactor 12R, input node 3a, the switch (R-phase arm 3R), and DC line L3. Since the capacitance value of capacitor C2 is sufficiently larger than the capacitance value of capacitor 11R, terminal-to-terminal voltage En of capacitor C2 slightly lowers.

In Mode 2, as shown in FIG. 14, switch 98 (R-phase arm 3R) connects DC line L2 and input node 3a, and the terminal-to-terminal voltage of capacitor 11R is reset to 0 V. In a time period in which voltage command signal 104A is negative, therefore, Mode 3 and Mode 2 are alternately executed, so that capacitor C2 is discharged, and terminal-to-terminal voltage En of capacitor C2 gradually lowers.

As shown by switching patterns 121A to 124A in FIG. 10, when Ep>En, the time in which Mode 1 is executed (the discharging time of capacitor C1) is longer than the time in which Mode 3 is executed (the discharging time of capacitor C2), and therefore Ep lowers faster than En.

As shown by switching patterns 131A to 134A in FIG. 10, when Ep<En, the time in which Mode 3 is executed (the discharging time of capacitor C2) is longer than the time in which Mode 1 is executed (the discharging time of capacitor C1), and therefore En lowers faster than Ep.

As a result, the absolute value of ΔE=Ep−En decreases. When the absolute value of ΔE=Ep−En becomes lower than threshold voltage ETH, output signal DT of determiner 64 (FIG. 6) goes to "L" level that is the inactive level, PWM circuit 65 is inactivated, and the operation of converter 3 is stopped.

FIG. 16 is a time chart showing the operation of control unit 54 shown in FIG. 7. In FIG. 16, voltage command signal 154 is a voltage command signal (V*) in a state not corrected by balance control circuit 72 (FIG. 7).

When Ep<En, the voltage command value (VB1*) indicated by adjustment signal Vc1 is positive. In this case, balance control circuit 72 adds adjustment signal Vc1 to voltage command signal 154 to change the voltage command signal (VA*) for IGBT devices Q1D and Q3D to voltage command signal 153. Balance control circuit 72 subtracts adjustment signal Vc1 from voltage command signal 154 to change the voltage command signal (VB*) for IGBT devices Q2D and Q4D to the corrected voltage command signal 155.

It can be understood from FIG. 16 that the switching patterns of four IGBT devices Q1D to Q4D included in semiconductor switch 21 (FIG. 4) have three modes. FIG. 17 is a diagram showing the switching patterns of IGBT devices Q1D to Q4D shown in FIG. 4. FIGS. 18(A) to 18(C) are circuit diagrams showing the operation of DC voltage converter 6 in three modes shown in FIG. 17.

Figure 18:
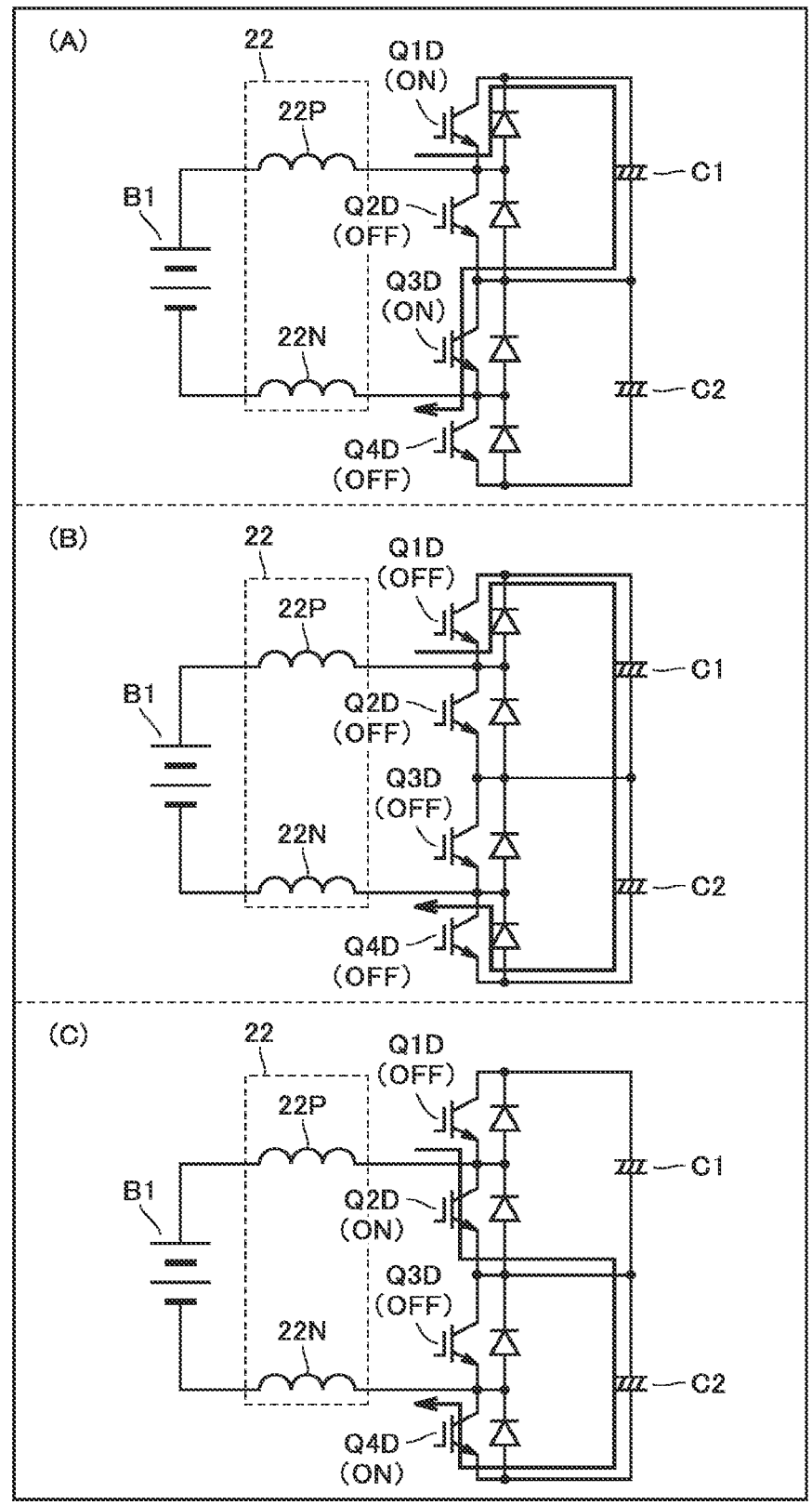
FIG. 18 is a circuit diagram showing the operation of the DC voltage converter in three modes shown in FIG. 17.

FIG. 18 (A) shows Mode 1. In Mode 1, IGBT devices Q1D and Q3D turn on, and positive-side smoothing capacitor C1 is charged. FIG. 18 (B) shows Mode 2. In Mode 2, IGBT devices Q1D to Q4D turn off, and the power storage states of positive-side smoothing capacitor C1 and negative-side smoothing capacitor C2 are not so different. FIG. 18 (C) shows Mode 3. In Mode 3, IGBT devices Q2D and Q4D turn on, and negative-side smoothing capacitor C2 is charged.

Returning to FIG. 16, in PWM circuit 75 (FIG. 7), the levels of voltage command signal 154 and reference signal 151 are compared, whereby switching patterns 161 and 163 of IGBT devices Q1 and Q3 are obtained. In PWM circuit 75, the levels of voltage command signal 154 and reference signal 152 are compared, whereby switching patterns 162 and 164 of IGBT devices Q2 and Q4 are obtained.

Reference signals 151 and 152 are both triangular wave signals. The frequency and the amplitude of reference signal 151 are the same as the frequency and the amplitude of reference signal 152. Reference signal 151 and reference signal 152 are out of phase by 180 degrees.

In time period t1 in which the level of reference signal 151 is lower than the level of voltage command signal 154, IGBT devices Q1 and Q3 are turned on (Mode 1). In a time period in which the levels of reference signals 151 and 152 are higher than the level of voltage command signal 154, IGBT devices Q1 to Q4 are turned off (Mode 2). In time period t2 in which the level of reference signal 152 is lower than the level of voltage command signal 154, IGBT devices Q2 and Q4 are turned on (Mode 3).

That is, in time period t1 of each period of reference signal 151, IGBT devices Q1D to Q4D are operated in Mode 1, and positive-side smoothing capacitor C1 is charged. In time period t2 of each period of reference signal 152, IGBT devices Q1D to Q4D are operated in Mode 3, and negative-side smoothing capacitor C2 is charged.

When Ep<En, the levels of voltage command signal 153 and reference signal 151 are compared, whereby switching patterns 171 and 173 of IGBT devices Q1D and Q3D are obtained. The levels of voltage command signal 155 and reference signal 152 are compared, whereby switching patterns 172 and 174 of IGBT devices Q2D and Q4D are obtained. In this case, as shown in FIG. 12, in time period t11 of each period T of reference signal 151, IGBT devices Q1D to Q4D are operated in Mode 1, and positive-side smoothing capacitor C1 is charged. In time period t12 of each period T of reference signal 152, IGBT devices Q1D to Q4D are operated in Mode 3, and negative-side smoothing capacitor C2 is charged.

When the switching pattern (161 to 164) without correction is compared with the switching pattern (171 to 174) with correction, the charging period (t11) of positive-side smoothing capacitor C1 is longer than the charging period (t12) of negative-side smoothing capacitor C2, and therefore voltage Ep can be raised relative to voltage En. Since adjustment signal Vc1 is output such that Ep=En is achieved, the voltages of smoothing capacitors C1 and C2 are matched and balanced.

Figure 19:
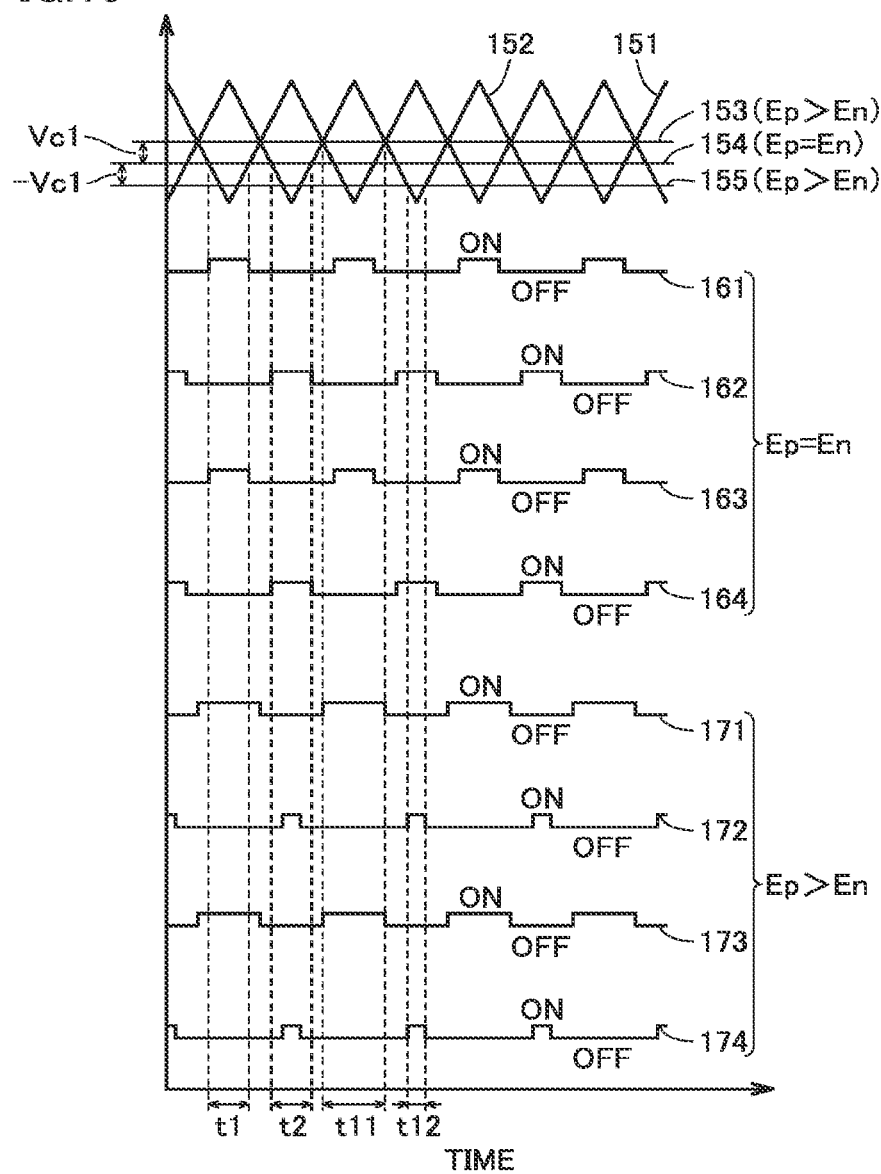
FIG. 19 is another time chart showing the operation of control unit 54 shown in FIG. 7.

FIG. 19 is another time chart showing the operation of control unit 54 shown in FIG. 7. In FIG. 19, voltage command signal 154 is a voltage command signal (V*) in a state not corrected by balance control circuit 72 (FIG. 7).

When Ep>En, the voltage command value (VB1*) indicated by adjustment signal Vc1 is negative. In this case, balance control circuit 72 adds adjustment signal Vc1 to voltage command signal 154 to change the voltage command signal (VA*) for IGBT devices Q1D and Q3D to voltage command signal 155. Balance control circuit 72 subtracts adjustment signal Vc1 from voltage command signal 154 to change the voltage command signal (VB*) for IGBT devices Q2D and Q4D to the corrected voltage command signal 153.

In this case, the levels of voltage command signal 155 and reference signal 151 are compared in PWM circuit 75, whereby switching patterns 181 and 183 shown in FIG. 15 are obtained as the switching patterns of IGBT devices Q1D and Q3D. The levels of voltage command signal 153 and reference signal 152 are compared in PWM circuit 75, whereby switching patterns 182 and 184 shown in FIG. 19 are obtained as the switching patterns of IGBT devices Q2D and Q4D.

When Ep>En, as shown in FIG. 19, in time period t11 of each period of reference signal 151, IGBT devices Q1D to Q4D are operated in Mode 1, so that positive-side smoothing capacitor C1 is charged. In time period t12 of each period of reference signal 152, IGBT devices Q1D to Q4D are operated in Mode 3, and negative-side smoothing capacitor C2 is charged.

When the switching pattern (161 to 164) without correction is compared with the switching pattern (181 to 184) with correction, the charging period (t11) of positive-side smoothing capacitor C1 is shorter than the charging period (t12) of negative-side smoothing capacitor C2, and therefore voltage En can be raised relative to voltage Ep. Since adjustment signal Vc1 is output such that Ep=En is achieved, the voltages of smoothing capacitors C1 and C2 are matched and balanced.

The operation of uninterruptible power supply apparatus U1 shown in FIG. 1 to FIG. 19 will now be described. In a sound state of commercial AC power supply 41, switch 1 is turned on, three-phase AC power from commercial AC power supply 41 is supplied to converter 3 through switch 1 and AC input filer 2 and is converted to DC power by converter 3. The DC power is stored into battery B1 by DC voltage converter 6 and converted to three-phase AC power by inverter 4. The three-phase AC power generated by inverter 4 is supplied to load 42 through AC output filter 5 to drive load 42.

At this time, converter 3 is controlled by control unit 53 (FIG. 6) such that voltage VDC=Ep+En that is the sum of terminal-to-terminal voltages Ep and En of capacitors C1 and C2 becomes reference DC voltage VDCr and voltage ΔE=Ep−En that is the difference between terminal-to-terminal voltages Ep and En of capacitors C1 and C2 becomes zero.

In a power failure of commercial AC power supply 41, basically, switch 1 is turned off, the operation of converter 3 is stopped, and DC power of battery B1 is supplied to inverter 4 through DC voltage converter 6 and converted to three-phase AC power having a commercial frequency by inverter 4. The three-phase AC power generated by inverter 4 is supplied to load 42 through AC output filter 5 to drive load 42.

At this time, DC voltage converter 6 is controlled by control unit 54 (FIG. 7) such that voltage VDC=Ep+En that is the sum of terminal-to-terminal voltages Ep and En of capacitors C1 and C2 becomes reference DC voltage VDCr and voltage ΔE=Ep−En that is the difference between terminal-to-terminal voltages Ep and En of capacitors C1 and C2 becomes zero.

However, as shown in FIG. 2, when load 42 includes three-phase four-wire transformer 43 and load body 46, three-phase excitation current flows through transformer 43, and each of three-phase output currents of uninterruptible power supply apparatus U1 has a positive-negative asymmetric waveform. When all of the AC power supply, the uninterruptible power supply apparatus, the three-phase transformer, and the load body are three-phase three-wire systems, the sum of three-phase AC currents flowing through the three-phase transformer is zero and therefore it is less likely that terminal-to-terminal voltages Ep and En of capacitors C1 and C2 are imbalanced.

However, in the present first embodiment, since commercial AC power supply 41, uninterruptible power supply apparatus U1, transformer 43, and load body 46 are three-phase four-wire systems and current flows through neutral point line L4, the sum of three-phase AC currents flowing through transformer 43 is not zero, and terminal-to-terminal voltages Ep and En of capacitors C1 and C2 may become imbalanced. In particular when load current is small, in a power failure of commercial AC power supply 41, output current of DC voltage converter 6 becomes small, and the imbalance between terminal-to-terminal voltages Ep and En of capacitors C1 and C2 may be unable to be eliminated.

Then, in the present first embodiment, in a power failure of commercial AC power supply 41, when voltage ΔE=Ep−En that is the difference between terminal-to-terminal voltages Ep and En of capacitors C1 and C2 exceeds threshold voltage ETH, converter 3 is activated. Converter 3 allows electric charge of capacitors C1 and C2 to be discharged to the AC input filter 2 side and reduces ΔE=Ep−En that is the difference between terminal-to-terminal voltages Ep and En of capacitors C1 and C2. When ΔE=Ep−En becomes lower than predetermined threshold voltage ETH, the operation of converter 3 is stopped.

As described above, in the present first embodiment, in a power failure of commercial AC power supply 41, switch 1 is turned off to electrically cut off commercial AC power supply 41 from AC input filter 2, and DC voltage converter 6 is controlled such that DC voltage ΔE=Ep−En that is the difference between terminal-to-terminal voltages Ep and En of capacitors C1 and C2 is eliminated, and when ΔE exceeds threshold voltage ETH, converter 3 is controlled to reduce ΔE. Therefore, even when load 42 includes three-phase four-wire transformer 43 and load body 46, and load current is small, the imbalance between terminal-to-terminal voltages Ep and En of capacitors C1 and C2 in a power failure can be eliminated.

Second Embodiment

Figure 20:
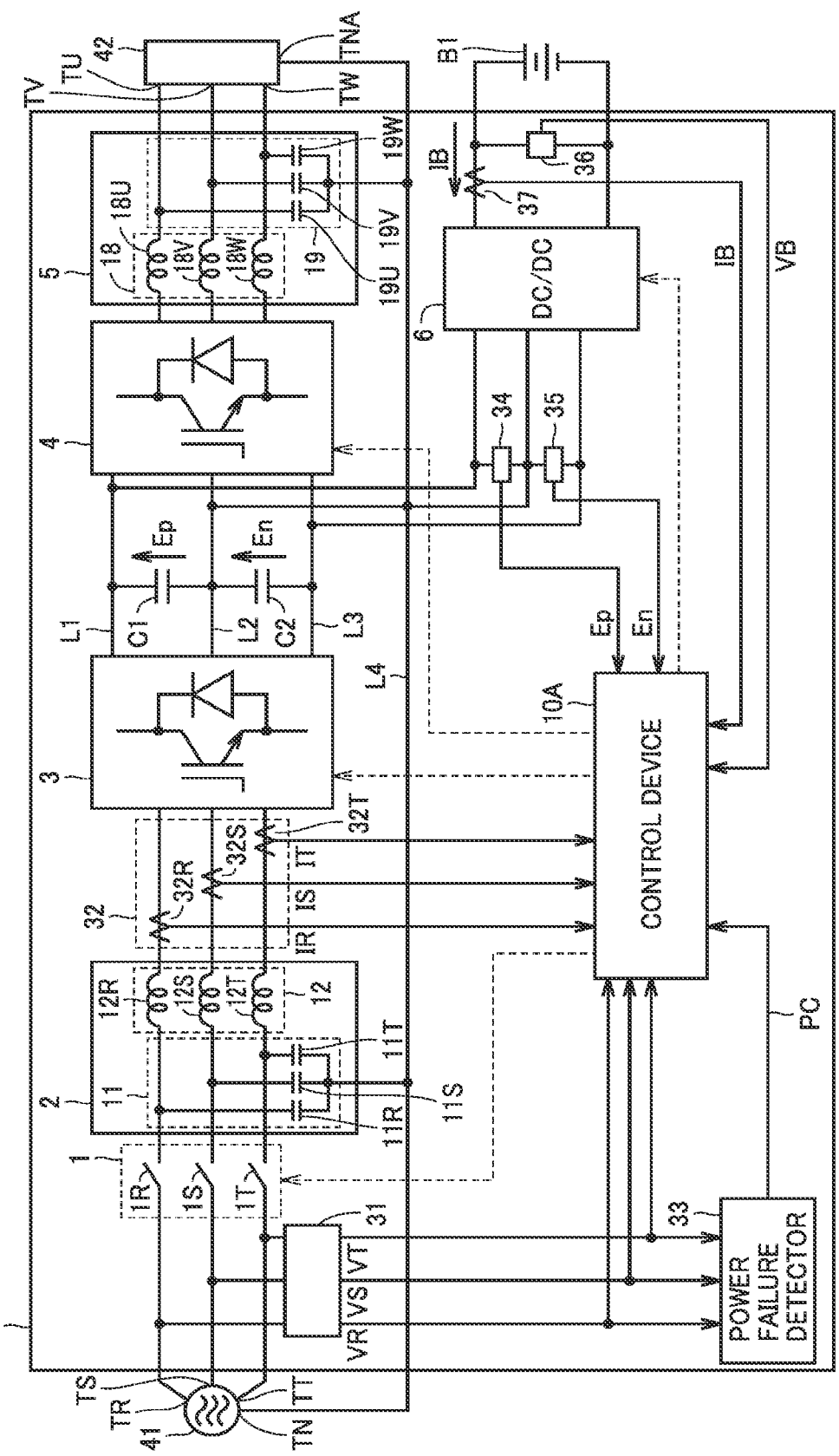
FIG. 20 is a circuit block diagram showing an overall configuration of an uninterruptible power supply apparatus according to a second embodiment of the present invention.

FIG. 20 is a circuit block diagram showing an overall configuration of an uninterruptible power supply apparatus U2 according to a second embodiment of the present invention, in comparison with FIG. 1. Referring to FIG. 20, this uninterruptible power supply apparatus U2 differs from uninterruptible power supply apparatus U1 in that voltage detector 31 detects instantaneous values of AC voltages VR, VS, and VT appearing at one terminals (the terminals on the commercial AC power supply 41 side) of switches 1R, 1S, and 1T and that control device 10 is replaced by a control device 10A.

In a sound state of commercial AC power supply 41, switch 1 is turned on, and the operation of uninterruptible power supply apparatus U2 is the same as the operation of uninterruptible power supply apparatus U1. In uninterruptible power supply apparatus U2, since voltage detector 31 detects instantaneous values of AC voltages VR, VS, and VT appearing at one terminals (the terminals on the commercial AC power supply 41 side) of switches 1R, 1S, and 1T, recovery of commercial AC power supply 41 from a power failure state to a sound state can be detected easily and quickly.

In uninterruptible power supply apparatus U1, since voltage detector 31 detects instantaneous values of AC voltages VR, VS, and VT appearing at the other terminals (the terminals on the AC input filter 2 side) of switches 1R, 1S, and 1T, it is necessary to separately provide means for detecting recovery of commercial AC power supply 41 from a power failure state to a sound state.

However, in uninterruptible power supply apparatus U2, since voltage detector 31 detects instantaneous values of AC voltages VR, VS, and VT appearing at one terminals of switches 1R, 1S, and 1T, the detected value of voltage detector 31 is an inaccurate and unstable value in a power failure of commercial AC power supply 41, and control unit 53 (FIG. 5) may cause a malfunction. To cope with this, control device 10 is replaced by control device 10A.

Figure 21:
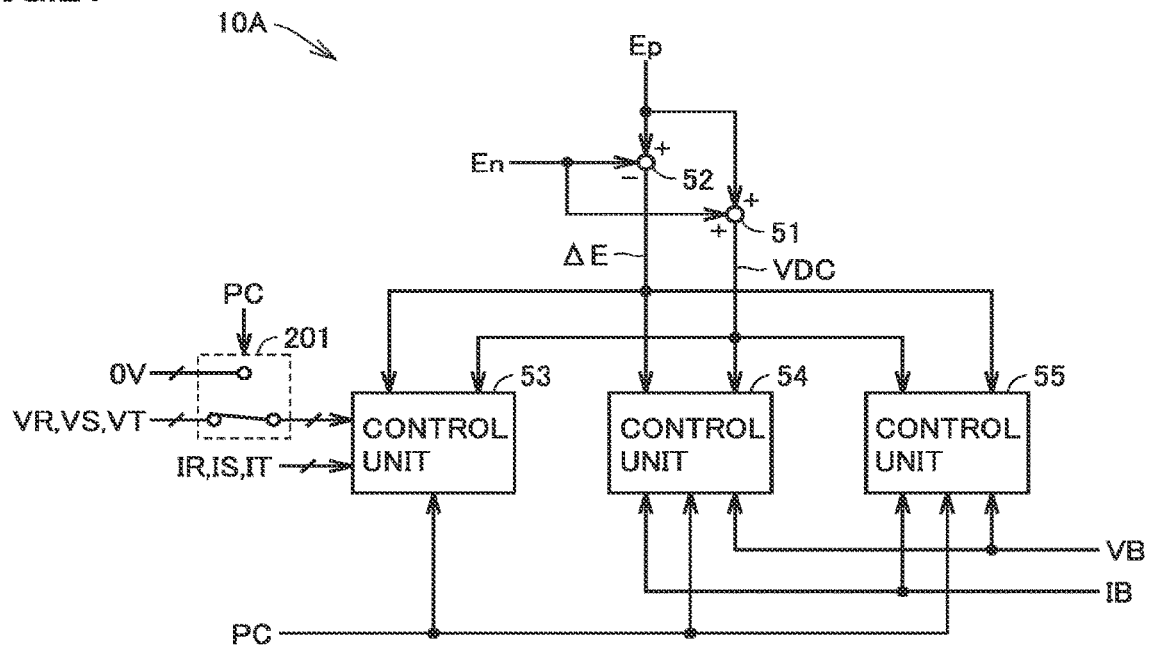
FIG. 21 is a circuit block diagram showing the main part of a control device shown in FIG. 20.

FIG. 21 is a circuit block diagram showing the main part of control device 10A, in comparison with FIG. 5. Referring to FIG. 21, control device 10A is formed by adding a switch circuit 201 to control device 10. Switch circuit 201 applies signals indicating AC voltages VR, VS, and VT detected by voltage detector 31 to control unit 53 when power failure signal PC is "L" level that is the inactive level (in a sound state of commercial AC power supply 41).

Switch circuit 201 applies a signal indicating 0 V instead of signals indicating AC voltages VR, VS, and VT detected by voltage detector 31 to control unit 53 when power failure signal PC is "H" level that is the active level (in a power failure of commercial AC power supply 41). The detected value of voltage detector 31 therefore is a constant value even in a power failure of commercial AC power supply 41, thereby preventing a malfunction of control unit 53.

Figure 22:
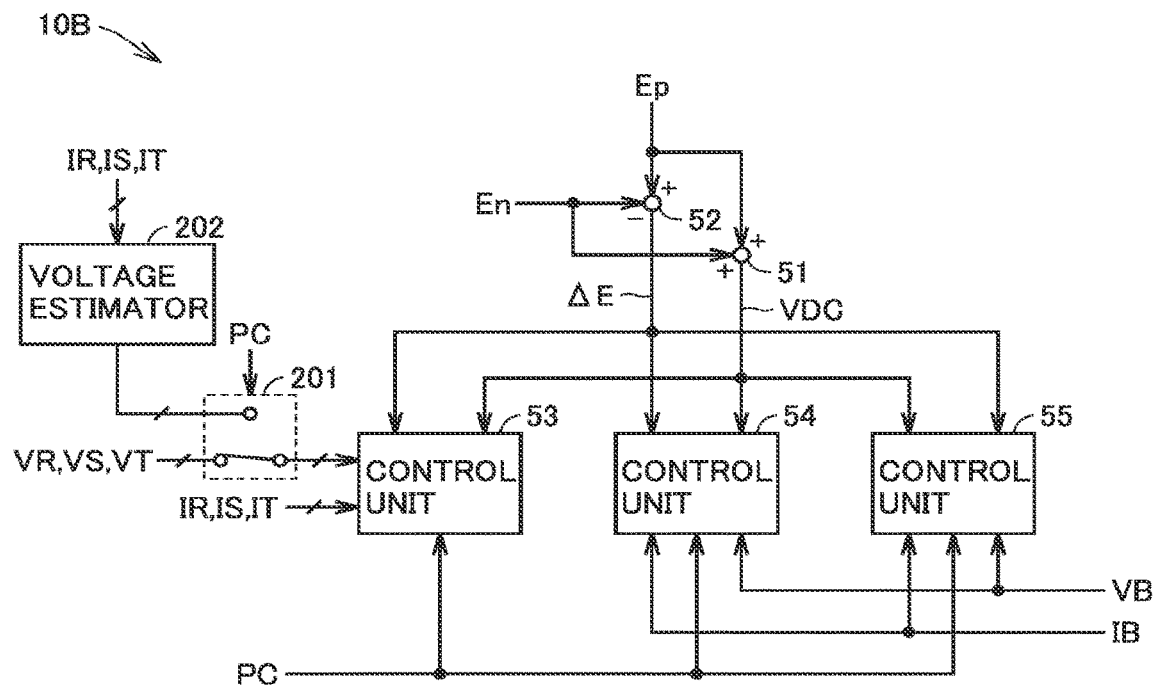
FIG. 22 is a circuit block diagram showing a modification to the second embodiment.

FIG. 22 is a circuit block diagram showing a modification to the second embodiment, in comparison with FIG. 21. Referring to FIG. 22, in this modification, a control device 10B is provided instead of control device 10A. Control device 10B is formed by adding a voltage estimator 202 to control device 10A. Voltage estimator 202 estimates instantaneous values of three-phase AC voltages appearing at the other terminals (the terminals on the AC input filter 2 side) of switches 1R, 1S, and 1T, based on signals indicating three-phase AC currents IR, IS, and IT detected by current detector 32, and outputs signals indicating the estimated values. For example, voltage estimator 202 integrates three-phase AC currents IR, IS, and IT detected by current detector 32 and estimates three-phase AC voltages.

Switch circuit 201 applies signals indicating AC voltages VR, VS, and VT detected by voltage detector 31 to control unit 53 when power failure signal PC is "L" level that is the inactive level (in a sound state of commercial AC power supply 41). Switch circuit 201 applies signals indicating three-phase AC voltages from voltage estimator 202 to control unit 53 when power failure signal PC is "H" level that is the active level (in a power failure of commercial AC power supply 41). This modification therefore also can prevent occurrence of a malfunction of control unit 53 in a power failure of commercial AC power supply 41.

Third Embodiment

Figures 23, 24:
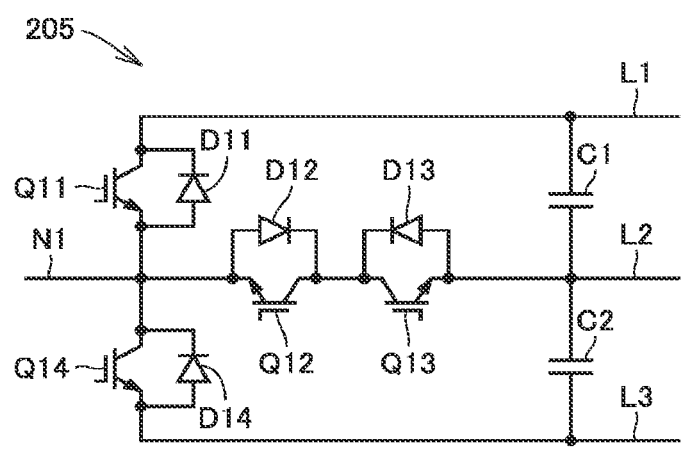
FIG. 23 is a circuit diagram showing the main part of an uninterruptible power supply apparatus according to a third embodiment of the present invention.
FIG. 24 is a diagram showing the switching patterns of four IGBT devices included in each phase arm of the converter shown in FIG. 23.

FIG. 23 is a circuit diagram showing the main part of an uninterruptible power supply apparatus according to a third embodiment of the present invention, in comparison with FIG. 3. Referring to FIG. 23, the third embodiment differs from the first embodiment in that each of arms 3R, 3S, 3T, 4U, 4V, and 4W is configured with a three-level circuit 205. Three-level circuit 205 includes IGBT devices Q11 to Q14 and diodes D11 to D14.

The collector of IGBT device Q11 is connected to DC line L1, and the emitter thereof is connected to node N1. The collectors of IGBT devices Q12 and Q13 are connected to each other, and the emitters thereof are connected to node N1 and DC line L2, respectively. The collector of IGBT device Q14 is connected to node N1, and the emitter thereof is connected to DC line L3. Diodes D11 to D14 are respectively connected in anti-parallel with IGBT devices Q11 to Q14.

When three-level circuit 205 forms R-phase arm 3R of converter 3, node N1 corresponds to input node 3a of converter 3. When three-level circuit 205 forms S-phase arm 3S of converter 3, node N1 corresponds to input node 3b of converter 3. When three-level circuit 205 forms T-phase arm 3T of converter 3, node N1 corresponds to input node 3c of converter 3.

When three-level circuit 205 forms U-phase arm 3U of inverter 4, node N1 corresponds to output node 4a of inverter 4. When three-level circuit 205 forms V-phase arm 3V of inverter 4, node N1 corresponds to output node 4b of inverter 4. When three-level circuit 205 forms W-phase arm 3W of inverter 4, node N1 corresponds to output node 4c of inverter 4.

As shown in FIG. 9 and FIG. 10, the switching patterns of the IGBT devices of the phase arm have three modes. FIG. 24 is a diagram showing the switching patterns of four IGBT devices Q11 to Q14 shown in FIG. 23, in comparison with FIG. 11. FIGS. 25(A) to 25(C) are circuit diagrams showing the operation of each phase arm in the modes shown in FIG. 24.

FIG. 25(A) shows Mode 1. In Mode 1, IGBT devices Q11 and Q12 turn on, and positive-side smoothing capacitor C1 is charged (or discharged). FIG. 25(B) shows Mode 2. In Mode 2, IGBT devices Q12 and Q13 turn on, and the power storage states of positive-side smoothing capacitor C1 and negative-side smoothing capacitor C2 are not so different.

FIG. 25(C) shows Mode 3. In Mode 3, IGBT devices Q13 and Q14 turn on, and negative-side smoothing capacitor C2 is charged (or discharged). In FIGS. 25(A) and 25(C), the arrows show the direction of current flowing during charging. During discharging, current flows in the opposite direction to the arrows. Therefore, three-level circuit 205 is equivalent to switch 98 (FIG. 8).

The other configuration and operation is similar to that of the first embodiment and a description thereof is not repeated. The present third embodiment achieves the effect similar to the first embodiment.

The embodiments disclosed here should be understood as being illustrative rather than being limitative in all respects. The present invention is shown not in the foregoing description but in the claims, and it is intended that all modifications that come within the meaning and range of equivalence to the claims are embraced here.

REFERENCE SIGNS LIST

U1, U2 uninterruptible power supply apparatus, 1, 98 switch, 2 input filter, 3 converter, 3R R-phase arm, 3S S-phase arm, 3T T-phase arm, 4 inverter, 4U U-phase arm, 4V V-phase arm, 4W W-phase arm, 5 output filter, 6 DC voltage converter, B1 power storage battery, 10, 10A, 10B control device, 11, 11R, 11S, 11T, C1, C2, 19, 19U, 19V, 19W capacitor, 12, 12R, 12S, 12T, 18, 18U, 18V, 18W, 22, 22N, 22P reactor, L1 to L3 DC line, L4 neutral point line, 21 semiconductor switch, 31, 34, 35, 36 voltage detector, 32, 32R, 32S, 32T, 37 current detector, 33 power failure detector, 41 commercial AC power supply, 42 load, 43 transformer, 44U, 44V, 44W primary winding, 45U, 45V, 45W secondary winding, 46 load body, Q1R to Q4R, Q1S to Q4S, Q1T to Q4T, Q1U to Q4U, Q1V to Q4V, Q1W to Q4W, Q1D to Q4D, Q11 to Q14 IGBT device, D1R to D6R, D1S to D6S, D1T to D6T, D1U to D6U, D1V to D6V, D1W to D6W, D1D to D4D, D11 to D14 diode, 51, 63A to 63C, 73A, 88A to 88C adder, 52, 82, 86A to 86C, 73B, 92, 94 subtracter, 53 to 55 control unit, 61, 71 voltage command generating circuit, 62, 72 balance control circuit, 64 determiner, 65, 75 PWM circuit, 81, 91 reference voltage generating circuit, 83 DC voltage control circuit, 84 sinusoidal wave generating circuit, 85A to 85C multiplier, 87, 95 current control circuit, 93 voltage control circuit, 201 switch circuit, 202 voltage estimator.

The invention claimed is:

1. An uninterruptible power supply apparatus comprising:
first to third DC lines;
a first capacitor connected between the first and second DC lines;
a second capacitor connected between the second and third DC lines;
a neutral point line connected to a neutral point terminal of a three-phase four-wire AC power supply, the second DC line, and a neutral point terminal of a three-phase four-wire load;
a switch provided corresponding to each phase of the AC power supply, having one terminal receiving AC voltage of a corresponding phase supplied from the AC power supply, turned on in a sound state of the AC power supply, and turned off in a power failure of the AC power supply;
an AC input filter including a third capacitor connected between the other terminal of the switch and the neutral point line, and a reactor having one terminal connected to the other terminal of the switch;
a converter connected between the other terminal of the reactor and the first to third DC lines and including a first multi-level circuit that converts AC voltage and first to third DC voltages to each other, the converter converting AC power from the AC power supply to DC power and supplying the DC power to the first to third DC lines in a sound state of the AC power supply;
a DC voltage converter connected between a DC power supply source and the first to third DC lines and including a second multi-level circuit that converts a fourth DC voltage supplied from the DC power supply source and the first to third DC voltages to each other, the DC voltage converter supplying DC power from the DC power supply source to the first to third DC lines in a power failure of the AC power supply;
an inverter provided between the first to third DC lines and the load and including a third multi-level circuit that converts the first to third DC voltages and AC voltage to each other, the inverter converting DC power supplied from the converter and the DC voltage converter to AC power and supplying the AC power to the load;
first and second voltage detectors that detect terminal-to-terminal voltages of the first and second capacitors, respectively;
a computing unit that obtains a first voltage that is a sum of terminal-to-terminal voltages of the first and second capacitors and a second voltage that is a difference between terminal-to-terminal voltages of the first and second capacitors, based on detection results of the first and second voltage detectors;
a first control unit, wherein
in a sound state of the AC power supply, the first control unit controls the converter such that the first voltage becomes a first reference voltage and the second voltage is eliminated, and
in a power failure of the AC power supply, the first control unit
stops the converter when an absolute value of the second voltage is smaller than a predetermined threshold voltage, and
controls the converter to reduce the second voltage when an absolute value of the second voltage is larger than the predetermined threshold voltage; and
a second control unit that controls the DC voltage converter such that the first voltage becomes the first reference voltage and the second voltage is eliminated, in a power failure of the AC power supply.

2. The uninterruptible power supply apparatus according to claim 1, wherein
the first control unit
controls the converter such that charging times of the first and second capacitors change, in a sound state of the AC power supply, and
controls the converter such that discharging times of the first and second capacitors change when an absolute value of the second voltage is larger than the predetermined threshold voltage, in a power failure of the AC power supply.

3. The uninterruptible power supply apparatus according to claim 1, further comprising:
a third voltage detector that detects an instantaneous value of AC voltage supplied from the AC power supply; and
a power failure detector that determines whether a power failure of the AC power supply has occurred based on a detected value of the third voltage detector, and outputs a power failure signal when a power failure of the AC power supply has occurred, wherein the first control unit controls the converter to reduce the second voltage, when the power failure signal is output from the power failure detector and when an absolute value of the second voltage is larger than the predetermined threshold voltage.

4. The uninterruptible power supply apparatus according to claim 3, further comprising a current detector that detects an instantaneous value of AC current flowing into the converter, wherein the first control unit includes a voltage control circuit that generates a current command value having a level corresponding to a deviation between the first reference voltage and the first voltage and changing sinusoidally, a current control circuit that generates a first voltage command value having a level corresponding to a deviation between the current command value and a detected value of the current detector, a first adder that adds a detected value of the third voltage detector to the first voltage command value to generate a second voltage command value, a balance control circuit that generates a third voltage command value having a level corresponding to the second voltage, a second adder that adds the third voltage command value to the second voltage command value to generate a fourth voltage command value, and a control signal generating circuit that is activated to generate a control signal for controlling the converter based on the fourth voltage command value, when the power failure signal is not output from the power failure detector and when the power failure signal is output from the power failure detector and an absolute value of the second voltage is larger than the predetermined threshold voltage.

5. The uninterruptible power supply apparatus according to claim 4, wherein the balance control circuit generates the third voltage command value such that charging times of the first and second capacitors change when the power failure signal is not output from the power failure detector, and generates the third voltage command value such that discharging times of the first and second capacitors change, when the power failure signal is output from the power failure detector and when an absolute value of the second voltage is larger than the predetermined threshold voltage.

6. The uninterruptible power supply apparatus according to claim 4, wherein the third voltage detector detects an instantaneous value of AC voltage appearing at the other terminal of the switch.

7. The uninterruptible power supply apparatus according to claim 4, wherein the third voltage detector detects an instantaneous value of AC voltage appearing at the one terminal of the switch, and the uninterruptible power supply apparatus further comprises a switch circuit provided between the third voltage detector and the first adder, the switch circuit applying a detected value of the third voltage detector to the first adder when the power failure signal is not output from the power failure detector, the switch circuit applying a signal indicating 0 V instead of a detected value of the third voltage detector to the first adder when the power failure signal is output from the power failure detector.

8. The uninterruptible power supply apparatus according to claim 4, wherein the third voltage detector detects an instantaneous value of AC voltage appearing at the one terminal of the switch, and the uninterruptible power supply apparatus further comprises:

a voltage estimator that estimates an instantaneous value of AC voltage appearing at the other terminal of the switch, based on a detected value of the current detector; and a switch circuit that applies an output signal of the third voltage detector to the first adder when the power failure signal is not output from the power failure detector, and applies an instantaneous value of AC voltage estimated by the voltage estimator instead of a detected value of the third voltage detector to the first adder when the power failure signal is output from the power failure detector.

9. The uninterruptible power supply apparatus according to claim 1, wherein the DC power supply source is a power storage device that stores DC power, the second multi-level circuit converts the fourth DC voltage supplied from the power storage device and the first to third DC voltages to each other, the DC voltage converter stores DC power generated by the converter into the power storage device in a sound state of the AC power supply, and supplies DC power of the power storage device to the first to third DC lines in a power failure of the AC power supply, and the uninterruptible power supply apparatus further comprises:

a third voltage detector that detects a terminal-to-terminal voltage of the power storage device; and a third control unit that controls the DC voltage converter such that a detected value of the third voltage detector becomes a second reference voltage, in a sound state of the AC power supply.

* * * * *